(12) United States Patent
Kitazawa

(10) Patent No.: US 12,164,720 B2
(45) Date of Patent: Dec. 10, 2024

(54) DISPLAY APPARATUS FOR RECEIVING EXTERNAL IMAGE AND DETECTING TOUCH PANEL INPUT AND METHOD FOR DRIVING THEREOF

(71) Applicant: Kazuki Kitazawa, Kanagawa (JP)

(72) Inventor: Kazuki Kitazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/339,608

(22) Filed: Jun. 22, 2023

(65) Prior Publication Data

US 2024/0012505 A1    Jan. 11, 2024

(30) Foreign Application Priority Data

Jul. 7, 2022  (JP) .................................. 2022-109882
Apr. 25, 2023  (JP) .................................. 2023-071657

(51) Int. Cl.
| | |
|---|---|
| G06F 3/041 | (2006.01) |
| G06F 3/04845 | (2022.01) |
| G06F 3/0488 | (2022.01) |
| G06F 3/14 | (2006.01) |

(52) U.S. Cl.
CPC ...... *G06F 3/04162* (2019.05); *G06F 3/04845* (2013.01); *G06F 3/0488* (2013.01); *G06F 3/1454* (2013.01); *G06F 2203/04104* (2013.01); *G06F 2203/04105* (2013.01)

(58) Field of Classification Search
CPC .................................................. G06F 3/04162
USPC ........................................................ 345/173
See application file for complete search history.

(56) References Cited

U.S. PATENT DOCUMENTS

| | | |
|---|---|---|
| 2012/0306927 A1 | 12/2012 | Lee et al. |
| 2014/0028613 A1 | 1/2014 | Hwang et al. |
| 2015/0077369 A1* | 3/2015 | Nagahara ............... G09G 5/003 345/173 |
| 2016/0173819 A1 | 6/2016 | Kitazawa |
| 2017/0019636 A1 | 1/2017 | Kitazawa et al. |
| 2017/0127017 A1 | 5/2017 | Takahashi et al. |

(Continued)

FOREIGN PATENT DOCUMENTS

| | | |
|---|---|---|
| JP | 2015-084211 | 4/2015 |
| JP | 2017-194978 | 10/2017 |
| JP | 2018-046454 | 3/2018 |

OTHER PUBLICATIONS

Extended European Search Report for 23182200.8 mailed on Nov. 28, 2023.

*Primary Examiner* — Long D Pham
(74) *Attorney, Agent, or Firm* — IPUSA, PLLC

(57) ABSTRACT

A display apparatus includes circuitry to display, on a touch panel display, an image received from an external device that is external to the display apparatus; detect coordinates of a position of an input means that has approached the position within a threshold distance from the touch panel display; transmit the coordinates of the input means that has approached the position to the external device based on a first determination result indicating that a predetermined condition is satisfied. Based on a second determination result indicating that the predetermined condition is not satisfied, the circuitry displays stroke data based on the coordinates of the input means that has approached the position so as to be superimposed on the image on the touch panel display.

18 Claims, 23 Drawing Sheets

(56) References Cited

U.S. PATENT DOCUMENTS

2018/0173395 A1 6/2018 Lee et al.
2020/0177582 A1 6/2020 Kitazawa
2020/0333994 A1* 10/2020 Sepulveda .......... G06F 3/04845
2020/0379639 A1 12/2020 Kitazawa

* cited by examiner

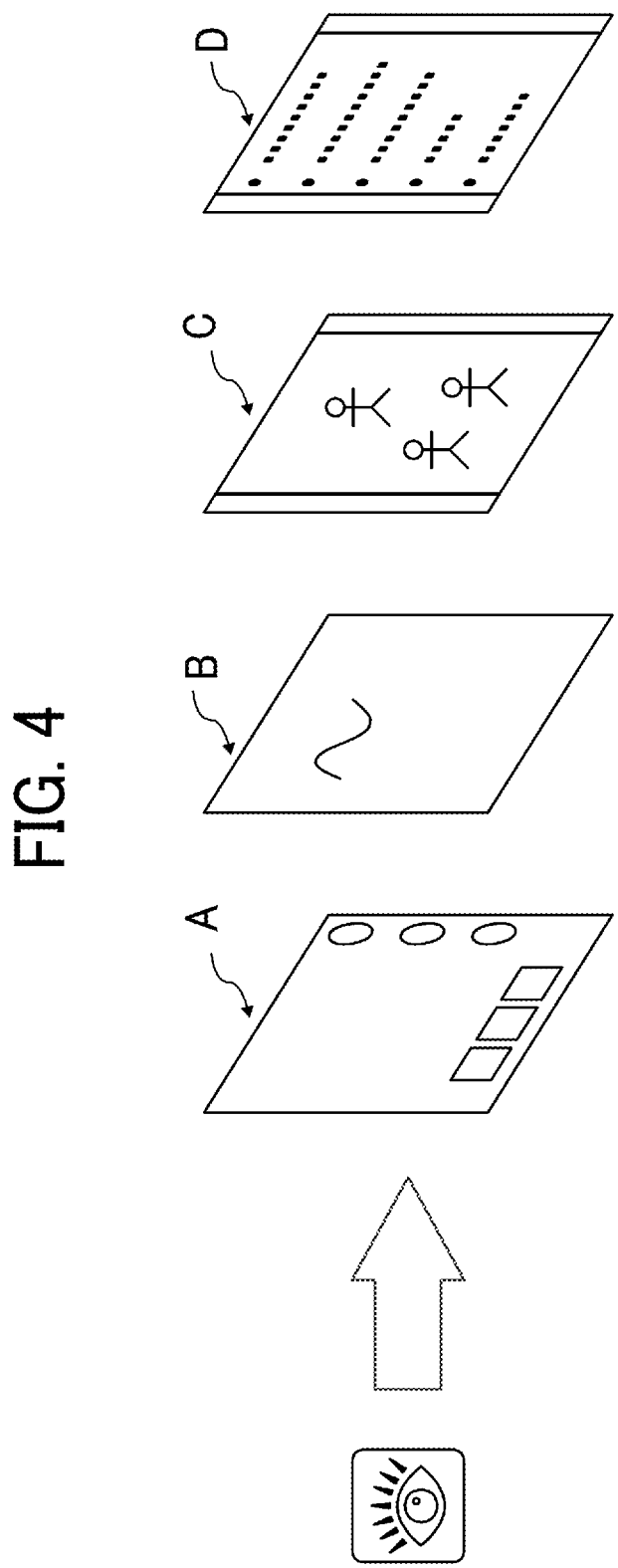

FIG. 8

| OPERATION ON TOUCH PANEL | DESCRIPTION | MOUSE OPERATION |
|---|---|---|
| TAP | THIS IS AN OPERATION OF LIGHTLY TOUCHING AN OBJECT ON THE SCREEN WITH ONE INPUT MEANS AND SEPARATING THE INPUT MEANS FROM THE OBJECT. | CLICK |
| PRESS AND HOLD | THIS IS AN OPERATION OF KEEP TOUCHING AN OBJECT ON THE SCREEN WITH ONE INPUT MEANS AND SEPARATING THE INPUT MEANS FROM THE OBJECT AFTER A CIRCLE IS DISPLAYED. A RIGHT CLICK MENU IS DISPLAYED. | RIGHT CLICK |
| PRESS AND TAP | THIS IS AN OPERATION OF, WHILE TOUCHING AN OBJECT ON THE SCREEN WITH ONE INPUT MEANS, TAPPING THE SCREEN WITH ANOTHER INPUT MEANS. A RIGHT CLICK MENU IS DISPLAYED. | RIGHT CLICK |
| DOUBLE TAP | THIS IS AN OPERATION OF TAPPING TWICE IN SUCCESSION AN OBJECT ON THE SCREEN WITH AN INPUT MEANS. THIS IS USED WHEN THE USER OPENS A FOLDER OR EXECUTES A PROGRAM. | DOUBLE CLICK |
| DRAG | THIS IS AN OPERATION OF TOUCHING AN OBJECT ON THE SCREEN WITH AN INPUT MEANS, MOVING THE INPUT MEANS TO A TARGET PLACE WITHOUT SEPARATING THE INPUT MEANS FROM THE OBJECT, AND SEPARATING THE INPUT MEANS FROM THE OBJECT. THIS IS USED FOR MOVING AN ICON OR SELECTING A RANGE, FOR EXAMPLE. | DRAG |
| PAN | THIS IS AN OPERATION OF MOVING AN INPUT MEANS THAT IS LIGHTLY TOUCHING THE SCREEN. THIS IS AN OPERATION OF MOVING A LARGE PAGE OR IMAGE THAT IS PARTLY HIDDEN, TO DISPLAY THE HIDDEN PORTION ON THE SCREEN. | SCROLL |
| FLICK | THIS IS AN OPERATION OF TOUCHING THE SCREEN WITH AN INPUT MEANS AND MOVING THE INPUT MEANS SO AS TO SWEEP THE SCREEN. THE DISPLAY CONTENTS ARE SCROLLED IN THE DIRECTION IN WHICH THE INPUT MEANS IS MOVED. THIS OPERATION IS USED FOR TURNING THE PAGE. | - |
| ZOOM | THIS IS AN OPERATION OF ENLARGING OR REDUCING. THE ENLARGING IS TO WIDEN THE INTERVAL, AND THE REDUCING IS TO NARROW THE INTERVAL. FOR ENLARGING, TOUCH THE SCREEN WITH ONE INPUT MEANS WHILE TOUCHING THE SCREEN WITH ANOTHER INPUT MEANS, AND MOVE THE TWO INPUT MEANS SO AS TO INCREASE THE INTERVAL THEREBETWEEN. ON THE OTHER HAND, FOR REDUCING, MOVE THE TWO INPUT MEANS SO AS TO PINCH THE SCREEN. | CTRL + SCROLL WHEEL |
| ROTATION | THIS IS AN OPERATION OF, WHILE TOUCHING THE SCREEN WITH THE FIRST INPUT MEANS (OR FINGER), TOUCHING THE SCREEN WITH THE SECOND INPUT MEANS AND MOVING THE SECOND INPUT MEANS TO DRAW A CIRCLE AROUND THE FIRST INPUT MEANS. | - |

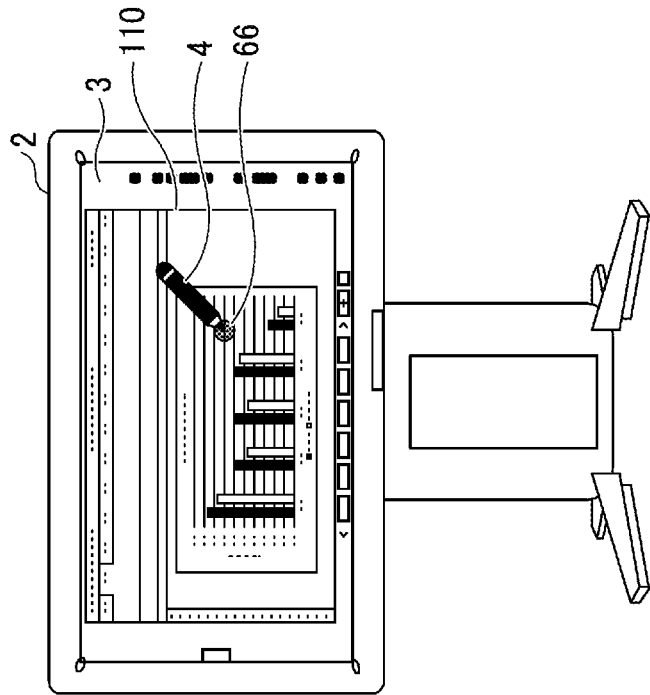
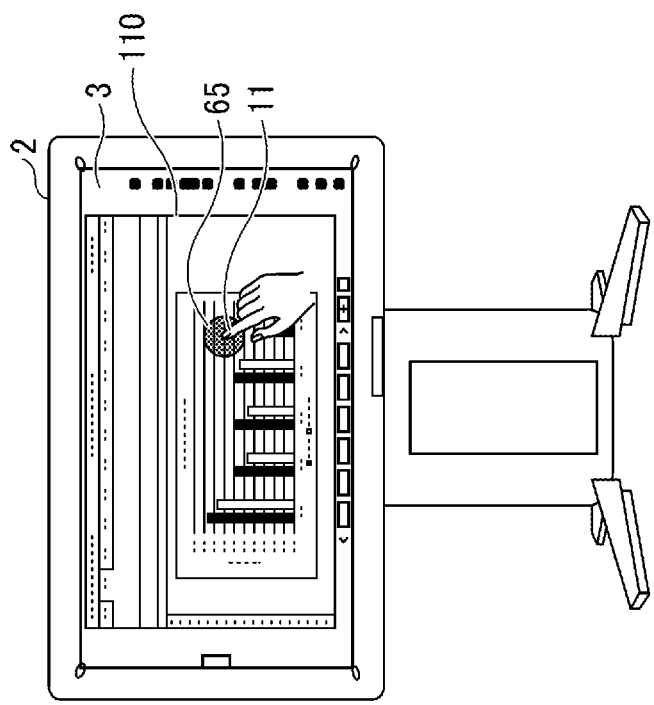

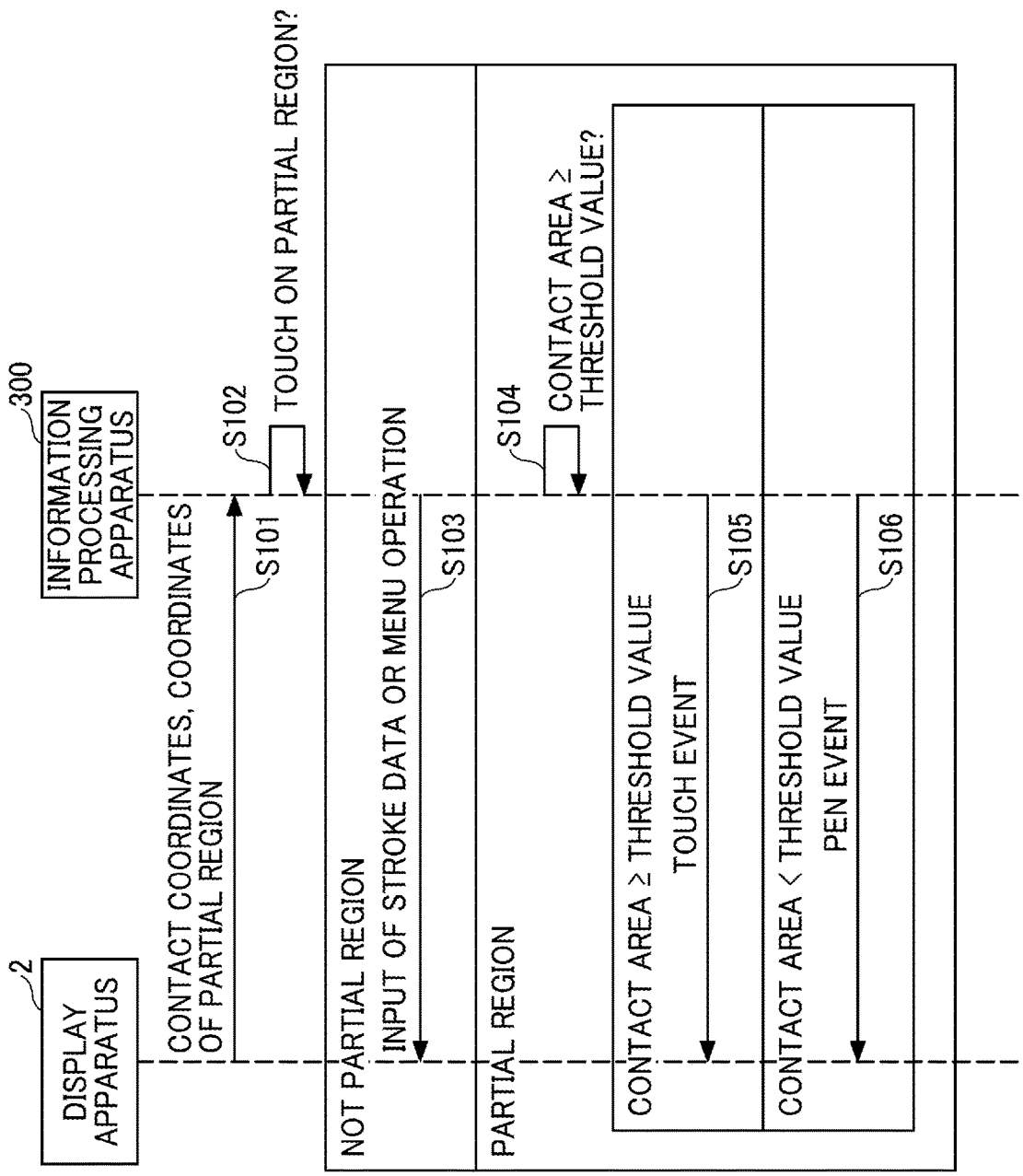

DISPLAY APPARATUS FOR RECEIVING EXTERNAL IMAGE AND DETECTING TOUCH PANEL INPUT AND METHOD FOR DRIVING THEREOF

CROSS-REFERENCE TO RELATED APPLICATIONS

This patent application is based on and claims priority pursuant to 35 U.S.C. § 119(a) to Japanese Patent Application Nos. 2022-109882, filed on Jul. 7, 2022, and 2023-071657, filed on Apr. 25, 2023, in the Japan Patent Office, the entire disclosure of which is hereby incorporated by reference herein.

BACKGROUND

Technical Field

Embodiments of the present disclosure relate to a display apparatus, a display system, a method performed by the display apparatus, and a non-transitory recording medium.

Related Art

There are display apparatuses such as electronic whiteboards having a touch panel display that displays hand drafted data including pieces of stroke data drawn based on strokes input by a user with an input means. Examples of the input means include input devices (e.g., stylus pen) and a portion of the user. Some display apparatuses have a function of displaying, on a screen, an image (or video) transmitted from an external device such as a personal computer (PC).

There is a technique that allows a user to control an external device transmitting an image to a display apparatus, with an operation performed on the display apparatus. For example, the display apparatus transmits coordinate information to the external device when a stylus pen touches a particular region on a display of the display apparatus.

SUMMARY

In one aspect, a display apparatus includes circuitry to display, on a touch panel display, an image received from an external device that is external to the display apparatus; detect coordinates of a position of an input means that has approached the position within a threshold distance from the touch panel display; transmit the coordinates of the input means that has approached the position to the external device based on a first determination result indicating that a predetermined condition is satisfied. Based on a second determination result indicating that the predetermined condition is not satisfied, the circuitry displays stroke data based on the coordinates of the input means that has approached the position so as to be superimposed on the image on the touch panel display.

In another aspect, a method performed by a display apparatus includes displaying, on a touch panel display, an image received from an external device external to the display apparatus; detecting coordinates of a position of an input means that has approached the position within a threshold distance from the touch panel display; determining whether a predetermined condition is satisfied; transmitting the coordinates of the input means that has approached the position to the external device based on a first determination result indicating that a predetermined condition is satisfied; and displaying stroke data based on the coordinates of the input means that has approached the position so as to be superimposed on the image on the touch panel display based on a second determination result indicating that the predetermined condition is not satisfied.

In another aspect, a non-transitory recording medium stores a plurality of program codes which, when executed by one or more processors, causes the processors to perform the method described above.

In another aspect, a display system includes a display apparatus including first circuitry to display an image received from an external device on a touch panel display, and an information processing device communicable with the display apparatus via a network. The information processing device includes second circuitry. The first circuitry of the display apparatus detects coordinates of a position of an input means that has approached a position within a threshold distance from the touch panel display, transmits the coordinates of the input means and coordinates of a region of the image on the touch panel display to the information processing apparatus, receive a determination result of whether a predetermined condition is satisfied, transmit the coordinates of the input means that has approached the position to the external device based on a first determination result indicating that the predetermined condition is satisfied, and display stroke data based on the coordinates of the input means that has approached the position so as to be superimposed on the image on the touch panel display based on a second determination result indicating that the predetermined condition is not satisfied. The second circuitry of the information processing apparatus transmits, to the display apparatus, the determination result indicating whether the predetermined condition is satisfied. The determination result is obtained based on the coordinates of the input means that has approached the position and the coordinates of the region of the image received from the display apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is an illustration of a configuration of image layers displayed by a display apparatus according to embodiments;

FIG. 8 is a diagram illustrating examples of an operation receivable by the external device based on contact coordinates transmitted from the display apparatus;

FIGS. 9A and 9B are diagrams illustrating an example of a method for a determination unit to determine an input means based on a contact area of the input means with the display;

FIG. 23 is a sequence diagram illustrating an example of an overall operation of the display system including the information processing apparatus illustrated in FIG. 22.

Figure 1A:
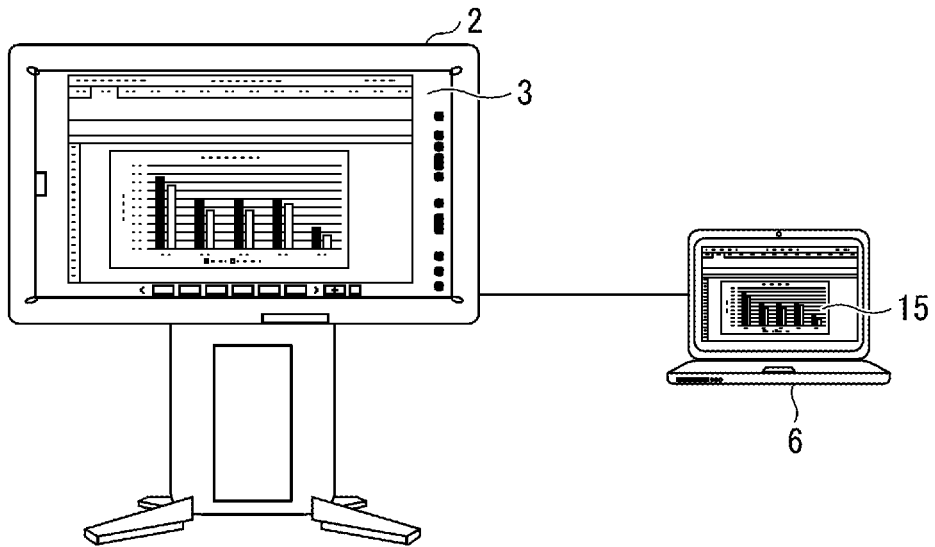
FIGS. 1A to 1C are diagrams illustrating an outline of processing performed by a display apparatus for switching between hand drafted input and control of an external device, common to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a display apparatus and a method performed by the display apparatus according to embodiments of the present disclosure, with reference to the attached drawings.

Embodiment 1

Figure 1B:
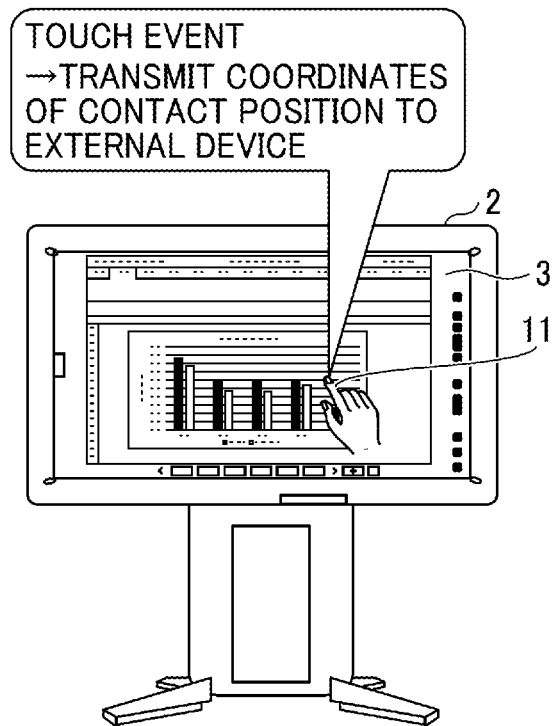
Figure 1C:
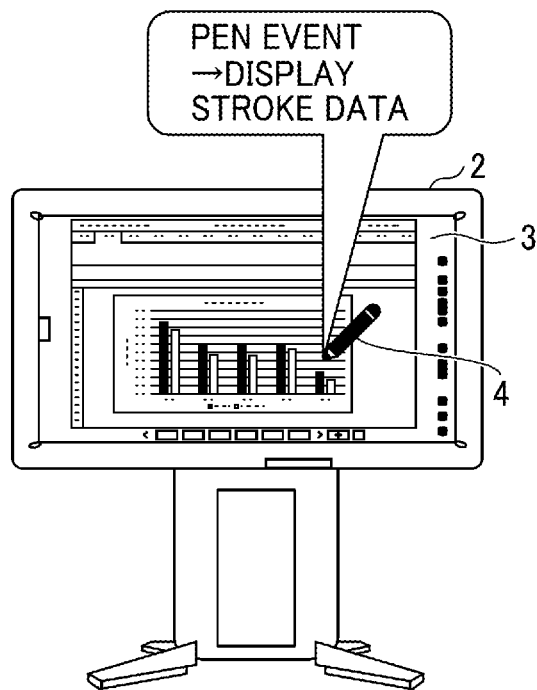

Switching Between Hand Drafted Input and Control of External Device FIGS. 1A to 1C are diagrams illustrating an outline of processing performed by a display apparatus 2 for switching between hand drafted input and control of an external device. As illustrated in FIG. 1A, the display apparatus 2 and an external device 6 are connected to each other by, for example, a High-Definition Multimedia Interface (HDMI) cable. The display apparatus 2 can display a screen displayed on a display 15 of the external device 6 on a larger screen. Hereinafter, the display content received by the display apparatus 2 from the external device 6 may be referred to as an external image, which may be a moving image (video). The user may wish to handwrite strokes on an external image displayed by the display apparatus 2 or may wish to control an application running on the external device 6 using a touch panel function of the display apparatus 2.

In such a case, in the related art, the user explicitly specifies whether the user is going to perform handwriting on the external video or operates a button or the like for controlling the external device 6, which increases the number of operation steps by the user. By contrast, based on whether a predetermined condition is satisfied, the display apparatus 2 according to the present embodiment determines whether a stroke on the external image is input or an operation for controlling the external device 6 is input. The predetermined condition in this embodiment is whether an input means that has input the stroke is a finger or a stylus pen (electronic pen).

As illustrated in FIG. 1B, when detecting an input by a finger 11 (touch event), the display apparatus 2 converts the coordinates of the finger 11 on the display 3 into the coordinates on the display 15 of the external device 6 and transmits the converted coordinates to the external device 6 via the cable, which may be a universal serial bus (USB) cable. The coordinates of the position touched by the input device are referred to as "contact coordinates." As illustrated in FIG. 1C, when detecting an input by the stylus pen (pen event), the display apparatus 2 receives hand drafted input of strokes by the stylus pen and displays the stroke data.

For example, whether the input means is the finger 11 or the stylus pen 4 is determined based on the following conditions, which will be described in detail later.

i) Contact area of the input means,
ii) Contact width or diameter of the input means,
iii) Presence or absence of contact signal,
iv) Pressing force of the input means against display, and
v) Whether two contact coordinates (input means) are detected.

As described above, in the present embodiment, the display apparatus 2 distinguishes a touch event with the finger 11 and a pen event with the stylus pen 4 selectively performed by the user, so as to automatically discriminate between the hand drafted input of strokes and the operation for controlling the external device 6. This configuration obviates a user operation for switching between the hand drafted input of the strokes and the operation for controlling the external device 6.

Terminology

The term "event" refers to receiving a request for processing from a user by the display apparatus 2. Examples of the event include a pen event and a touch event. The event starts when the request of processing from the user is received and ends when the processing according to the request ends. The term "pen event" refers to an event with which the input of stroke data is received based on contact coordinates. The term "touch event" refers to an event with which an operation for controlling the external device 6 is received based on contact coordinates or contactless coordinates. In Embodiments 1 and 3, for convenience of description, a touch with the stylus pen 4 is determined as a pen event, and a touch with the finger 11 is determined as a touch event. However, this relationship may be reversed. In Embodiment 2, there is no correspondence between the type of the input means and the discrimination between the pen event and the touch event. In the case of infrared ray sensing and capacitive sensing, the input means may be either the finger 11 or the stylus pen 4, and, in the case of electromagnetic induction sensing, the input means is the stylus pen 4.

The term "external device" refers to a device separate from the display apparatus 2 and is capable of communicating with the display apparatus 2 and transmitting an image to the display apparatus 2 in a wired or wireless manner. The external device is, for example, a personal computer (PC).

The term "touch panel" refers to a reception device (reception unit or reception display unit) that receives input of coordinates of the position touched by an input means or coordinates of the input means that is at a distance of less than a threshold value from the touch panel (contactless coordinates). The touch panel may be capable of detecting not only the coordinates but also a contact area and pressure. The touch panel is also referred to as, for example, a touch screen or a touch screen.

The term "coordinates" refers to a set of numbers given to specify the position of a particular point with reference to the origin. The set of numbers is a pair of numbers in two dimensions and a set of three numbers in three dimensions. In this embodiment, since the term "coordinates" mainly refers to the coordinates on the display, the set of numbers is a pair of numbers.

The term "image (image data)" refers to an image displayed on a display, a screen, or the like.

The image may be a still image or a moving image.

The term "touch" or "contact" refers to approaching and touching. The touch may be accompanied by a minimum pressure or deformation for at least one of the stylus pen and the touch panel to detect the touch. In other words, even if the stylus pen is visually in contact with the display, the display apparatus may not determine that the stylus pen is in contact with the display.

The term "contactless state" refers to not touching. In a state where the stylus pen is visually in contact with the display but does not cause the minimum pressure or deformation for detecting the touch, it may be determined that the stylus pen is not in contact.

The term "rod-shaped member" refers to a member shaped like a rod or bar, but, in the present embodiment, any member used as a substitute for a stylus pen. The rod-shaped member may be used for other purposes. For example, a writing instrument used for writing on paper may be substituted for a stylus pen.

The term "contact signal" refers to an electrical signal that is transmitted to the display apparatus 2 when the stylus pen is pressed against the display 3 of the display apparatus 2, to indicate that the stylus pen is pressed against the display 3. The item pressed by the stylus pen is not necessarily the display 3 of the display apparatus 2.

The term "pressing force" refers to a pressure caused by the stylus pen pressing against the display. The pressing force may be the detected pressure as it is, or may be a value per unit area obtained by dividing the detected pressure by the area of the display in contact with the stylus pen.

The term "entire screen" refers to the entire effective pixel region of the display capable of displaying an image. The entire screen may be the rest excluding a partial region (for example, display content is fixed and stroke data is not displayed) of the effective pixel region. The term "partial region" refers to a region of the screen smaller than the entire screen. The location of the partial region may not be fixed. The shape of the partial region is not limited to a rectangle but may be, for example, a circle or may be designated by the user.

The wording like "displaying images in an overlapping manner" refers to a state where another image is displayed in a manner overlapping an image. The image that is closer along the line-of-sight is displayed to be visible while the image that is farther along the line-of-sight is barely visible. For making the image that is farther along the line-of-sight visible, for example, the transparency of the image that is closer along the line-of-sight is adjusted. For example, a method using layers is used for displaying images in an overlapping manner. When the layer of the stroke image is arranged closer along the line-of-sight than the layer of the external image, the external image and the stroke data overlapping the external image are displayed.

The term "input means" may be any means by which a user inputs handwriting (hand drafting) by designating coordinates on a touch panel. Examples thereof include the stylus pen 4, the finger 11 of a person, a human hand, and a rod-shaped member. The stylus pen 4 may be any rod-shaped member and does not need to have a battery to change the capacitance or communicate with the display apparatus 2. Alternatively, the stylus pen 4 may be an electronic pen having a battery.

A series of user operations including engaging a writing mode, recording a movement of an input device or portion of a user, and then disengaging the writing mode is referred to as a stroke. The engaging of the writing mode may include, if desired, pressing an input device against a display or screen, and disengaging the writing mode may include releasing the input device from the display or screen. Alternatively, a stroke refers to tracing a movement of a portion of the user without contacting a display or screen. In this case, the input of strokes (writing mode) may be engaged or turned on by a gesture of a user, pressing a button by a hand or a foot of the user, or otherwise turning on the writing mode, for example using a pointing device such as a mouse. Further, the display apparatus may end tracking and recording strokes (recognize disengaging or turning off the writing mode) in response to the same or different gesture, releasing the button, or other operation, for example using the mouse or any other pointing device.

The term "stroke data" refers to data input by a user with a stroke using an input means and also refers to data displayed on a display based on a trajectory of coordinates of the input means. The stroke data may be interpolated appropriately. The term "hand drafted data" refers to data having one or more pieces of stroke data. The term "hand drafted input" refers to a user input such as handwriting, drawing, and other forms of input. The hand drafted input may be performed via a touch interface, with a tactile object such as a finger or stylus pen or with the user's body. The hand drafted input may also be performed via other types of input, such as gesture-based input, hand motion tracking input or other touch-free input by a user.

The external device 6 is a device separate from the display apparatus 2. The external device 6 may be any device that transmits an image to the display apparatus 2 to be displayed on the display apparatus 2 and receives an operation from the display apparatus 2 based on contact coordinates.

The term "predetermined condition" refers a condition for determining whether the input means is the finger 11, or a condition for determining whether the input means is in a contactless state. Determined that the finger 11 is used as the input means is an example of the case where the predetermined condition is satisfied. For example, when any one of the following conditions is true, the predetermined condition is satisfied (a first determination result).

The contact area or the width of a range in contact with the touch panel is equal to or larger than a threshold value.

A contact signal is not received.

The pressing force (deformation amount or the like) is smaller than a threshold value.

The number of the sets of contact coordinates is equal to or greater than a threshold number.

By contrast, determining that the input means is the stylus pen or a rod-shaped member (not a finger) is an example of the case where the predetermined condition is not satisfied. For example, when any one of the following conditions is true, the predetermined condition is not satisfied (a second determination result).

The contact area or the width of the range in contact with the touch panel is equal to or smaller than the threshold value.

A contact signal is received.

The pressing force (deformation amount or the like) is equal to or greater than the threshold value.

The number of the sets of contact coordinates is equal to or smaller than (or smaller than) the threshold number.

Example of System Configuration

Figure 2:
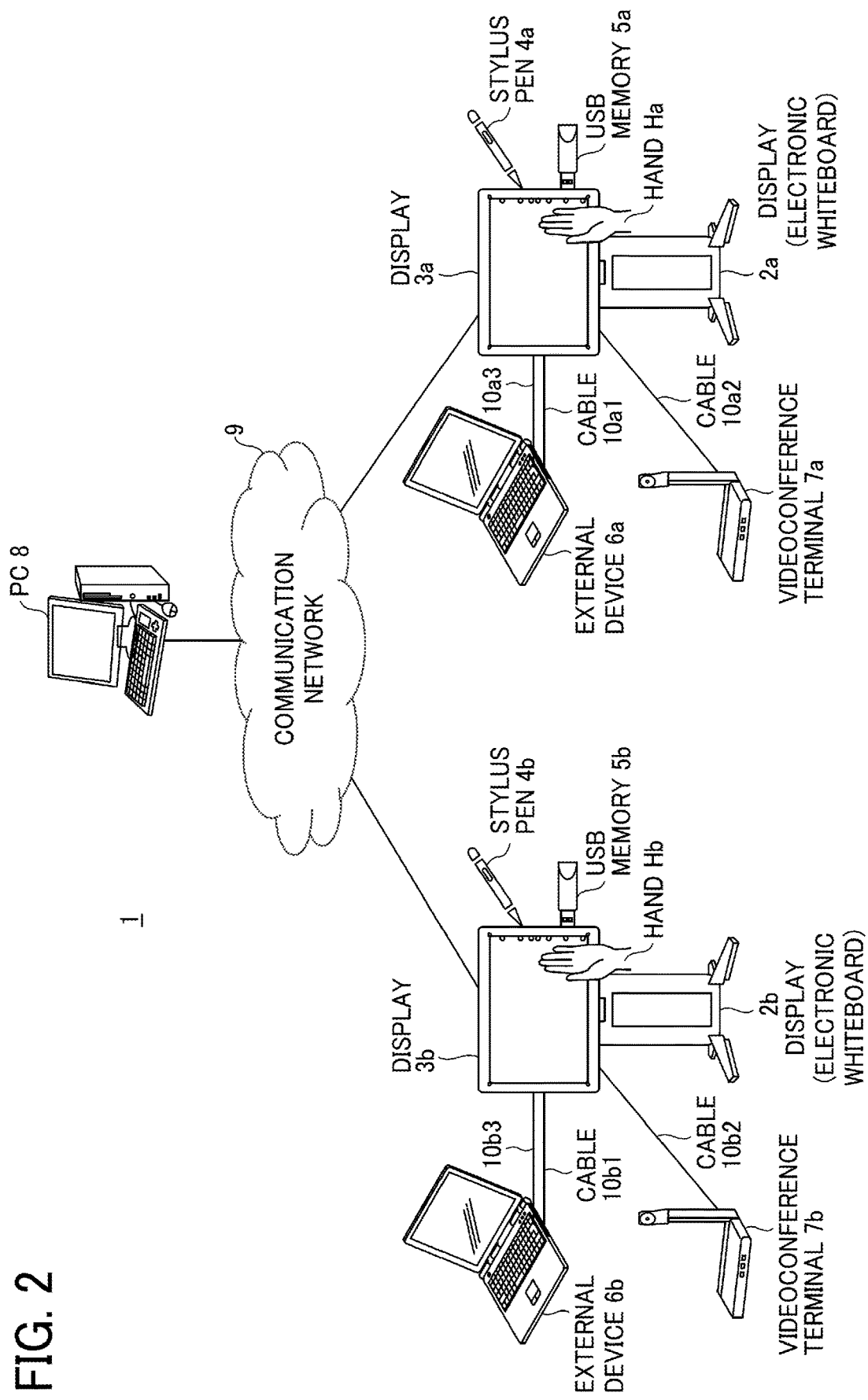
FIG. 2 is a schematic diagram illustrating a general arrangement of a communication system according to embodiments.

FIG. 2 is a schematic diagram illustrating an overview of a communication system 1 according to the present embodiment. In the example illustrated in FIG. 2, for ease of explanation, two display apparatuses 2a and 2b and two sets of elements such as stylus pens 4a and 4b related to the display apparatuses 2a and 2b are illustrated. However, the number of display apparatuses or stylus pens may be three or more.

As illustrated in FIG. 2, the communication system 1 includes the display apparatuses 2a and 2b, the stylus pens 4a and 4b, Universal Serial Bus (USB) memories 5a and 5b, external devices (personal computers) 6a and 6b, videoconference terminals (teleconference terminal) 7a and 7b, and a personal computer (PC) 8. The display apparatuses 2a and 2b and the PC 8 are connected to each other via a communication network 9 to communicate with each other. Further, the display apparatuses 2a and 2b include displays 3a and 3b (or screens), respectively.

The display apparatus 2a displays, on the display 3a, an image drawn by an event generated by the stylus pen 4a (e.g., a touch of the tip or bottom of the stylus pen 4a on the display 3a). The display apparatus 2a may change the image being displayed on the display 3a according to an event caused by a user's hand Ha (including the finger 11) in addition to the stylus pen 4a. An example of the event is a user hand gesture indicating enlargement, reduction, or page turning.

The USB memory 5a is connectable to the display apparatus 2a. The display apparatus 2a can read electronic files in, for example, a portable document format (PDF) from the USB memory 5a or can store an electronic file in the USB memory 5a. The display apparatus 2a is connected to the external device 6a via a cable 10a1 for communication that supports a communication standard such as DISPLAYPORT, a digital visual interface (DVI), HIGH-DEFINITION MULTIMEDIA INTERFACE (HDMI), or Video Graphics Array (VGA). Further, the display apparatus 2a is connected to the external device 6a via a communication cable 10a3 that is, for example, a USB cable or a USB Type-C cable. The display apparatus 2a generates an event based on a contact of the input means with the display 3a (screen). The display apparatus 2a transmits event information indicating the event to the external device 6a to the external device 6a via the communication cable 10a3 in a similar manner to an event generated based on an input by a mouse, a keyboard, or any other input device.

The cable 10a1 and the communication cable 10a3 may be integrated into one cable. The cable in this case may be, for example, a local area network (LAN) cable (for one-to-one communication or network connection) or a USB Type-C cable.

In substantially the same manner, the videoconference terminal (teleconference terminal) 7a is connected to the display apparatus 2a via a cable 10a2 for communication in compliance with the above-described standard. Alternatively, the external device 6a and the videoconference terminal 7a may communicate with the display apparatus 2a through a wireless LAN or wireless communication in compliance with any of various kinds of wireless communication protocols such as BLUETOOTH.

At another site where the display apparatus 2b is provided, in a similar manner to the above-described manner, the display apparatus 2b including the display 3b (screen), the stylus pen 4b, the USB memory 5b, the external device 6b, the videoconference terminal 7b, a cable 10b1, a cable 10b2, and a cable 10b3 are used. In addition, an image displayed on the display 3b can be changed according to an event caused by a user's hand Hb, for example.

With this configuration, an image drawn on the display 3a of the display apparatus 2a at a first site is also displayed on the display 3b of the display apparatus 2b at a second site. Conversely, an image drawn on the display 3b of the display apparatus 2b at the second site is displayed on the display 3a of the display apparatus 2a at the first site. Since the communication system 1 performs processing for sharing the same image between remotely located sites in this manner, the communication system 1 is useful when used in a conference (meeting) held among participants located at remote sites.

In the following, the "display apparatus 2" refers to any one of the plurality of display apparatuses 2 (e.g., 2a and 2b). Similarly, the "display 3" refers to any one of the plurality of displays 3 (e.g., 3a and 3b). The "stylus pen 4" refers to any one of the plurality of stylus pens 4 (e.g., 4a and 4b). The "USB memory 5" refers to any one of the plurality of USB memories 5 (e.g., 5a and 5b). The "external device 6" refers to any one of the plurality of external devices 6

(e.g., 6a and 6b). The "videoconference terminal 7 refers to any one of the plurality of videoconference terminals 7 (e.g., 7a and 7b). The "hand H" refers to any one of the plurality of the user's hands H (e.g., Ha and Hb). The "cable 10" refers to any one of the plurality of cables 10 (e.g., 10a and 10b).

In the present embodiment, an electronic whiteboard is described as one example of the display apparatus 2, but the display apparatus 2 is not limited thereto. Other examples of the display apparatus 2 include an electronic signboard (digital signage), a telestrator that is used, for example, in sports and weather broadcasts, and a remote image (video) diagnostic apparatus. Similarly, a laptop computer is described as one example of the external device 6, but the external device may be any communication terminal that supplies image frames. Examples of the external device 6 include a desktop PC, a tablet PC, a personal data assistance (PDA), a digital video camera, a digital camera, and a game console. Further, the communication network includes, for example, the Internet, a local area network (LAN), and a mobile communication network. In the present embodiment, a USB memory is described as one example of a recording medium, but the recording medium may be any desired recording medium, such as a secure digital (SD) card.

Hardware Configuration of Display Apparatus

Figure 3:
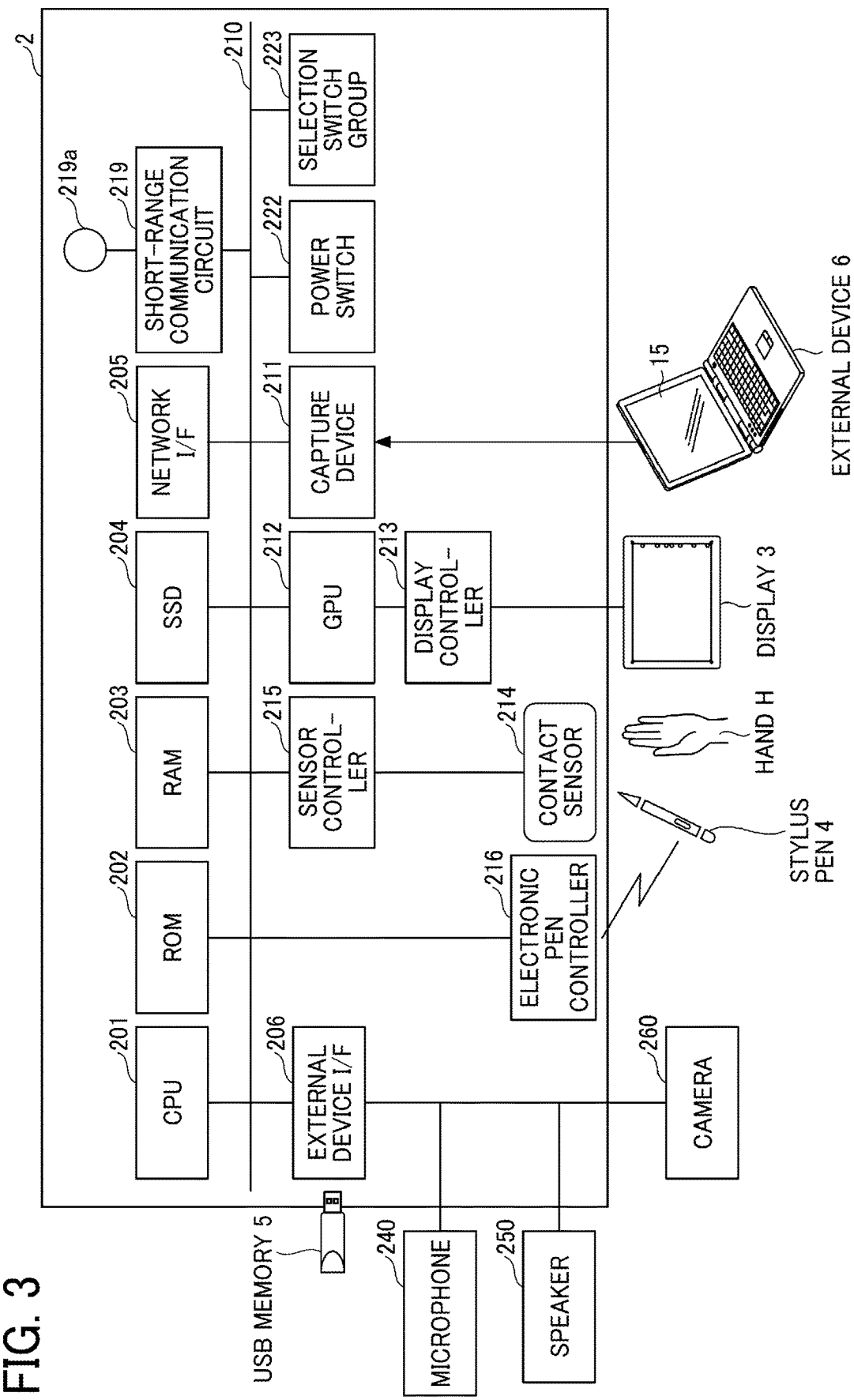
FIG. 3 is a block diagram illustrating a hardware configuration of a display apparatus according to embodiments.

A description is given of a hardware configuration of the display apparatus 2 according to the present embodiment, with reference to FIG. 3. FIG. 3 is a diagram illustrating an example of the hardware configuration of the display apparatus 2 according to the present embodiment. As illustrated in FIG. 3, the display apparatus 2 includes a central processing unit (CPU) 201, a read-only memory (ROM) 202, a random access memory (RAM) 203, a solid state drive (SSD) 204, a network interface (I/F) 205, and an external device I/F 206.

The CPU 201 controls the entire operation of the display apparatus 2. The ROM 202 stores a control program such as an initial program loader (IPL) to boot the CPU 201. The RAM 203 is used as a work area for the CPU 201.

The SSD 204 stores various data such as an operating system (OS) and a control program for the display apparatus 2. This program may be an application program that runs on an information processing apparatus equipped with a general-purpose operating system (OS) such as WINDOWS, MAC OS, ANDROID, and IOS. In this case, the display apparatus 2 is usually used as a general-purpose information processing apparatus. However, when a user executes an application program, the display apparatus 2 receives handwriting or the like performed by the user similar to a dedicated display apparatus.

The network I/F 205 controls communication with an external device via the communication network 9. The external device I/F 206 is an interface for connecting to various external devices. Examples of the external devices in this case include, but are not limited to, the USB memory 5, a microphone 240, a speaker 250, and a camera 260.

The display apparatus 2 further includes a capture device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and a selection switch group 223.

The capture device 211 captures, as a still image or a video, an image displayed on the display 15 of the external device 6. The GPU 212 is a semiconductor chip dedicated to graphics. The display controller 213 controls screen display for outputting an image processed by the GPU 212 to the display 3. The contact sensor 214 detects a touch of the stylus pen 4 or the user's hand H onto the display 3. The sensor controller 215 controls the operation of the contact sensor 214.

The contact sensor 214 inputs and detects coordinates by an infrared blocking system. The inputting and detecting of coordinates may be as follows. For example, two light receiving and emitting devices are disposed at both ends of the upper face of the display 3, and a reflector frame surrounds the periphery of the display 3. The light receiving and emitting devices emit a plurality of infrared rays in parallel to a surface of the display 3. The rays are reflected by the reflector frame, and a light-receiving element receives light returning through the same optical path of the emitted infrared rays. The contact sensor 214 outputs an identifier (ID) of the infrared ray that is blocked by an object after being emitted from the two light receiving and emitting devices, to the sensor controller 215. Based on the ID of the infrared ray, the sensor controller 215 detects specific coordinates representing the contact position touched by the object. In addition, the contact sensor 214 receives an electromagnetic wave transmitted from the tip of the stylus pen 4 to detect the coordinates of the stylus pen 4 before the stylus pen 4 comes into contact with the display 3.

The electronic pen controller 216 communicates with the stylus pen 4 to determine the presence or absence of a touch on the display 3 by the tip or bottom of the stylus pen 4. The short-range communication circuit 219 is a communication circuit that is compliant with Near Field Communication (NFC), BLUETOOTH, or the like.

The power switch 222 turns on or off the power of the display apparatus 2. The selection switch group 223 is a group of switches for adjusting brightness, hue, etc., of displaying on the display 3.

The display apparatus 2 further includes a bus line 210. The bus line 210 is an address bus or a data bus that electrically connects the elements illustrated in FIG. 3, such as the CPU 201, to each other.

The detecting system of the contact sensor 214 is not limited to the infrared blocking system. Examples of the detecting system employed by the contact sensor 214 include a capacitive touch panel that identifies the contact position by detecting a change in capacitance, a resistive film touch panel that identifies the contact position by detecting a change in voltage of two opposed resistive films, and an electromagnetic induction touch panel that identifies the contact position by detecting electromagnetic induction caused by contact of an object to the display. The electronic pen controller 216 may determine whether there is a touch of another part of the stylus pen 4 such as a part thereof held by the user as well as the tip and the bottom of the stylus pen 4.

Layer Structure

FIG. 4 is a diagram illustrating a layer structure of an image displayed by the display apparatus 2 according to the present embodiment. As illustrated in FIG. 4, the display apparatus 2 displays one image by superimposing a user interface (UI) image layer A, a stroke image layer B, an output image layer C, and a background image layer D. Each layer is subjected to display processing and input processing so as to include the following data (menu button, stroke data, image data input by the external device 6, and background image data).

The UI image layer A is a layer of a UI image including, for example, menu buttons to be operated by the user.

The stroke image layer B is a layer of an image including one or more stroke data (hand drafted data) displayed based on strokes by hand drafted input of a user.

The output image layer C is a layer of an image (still image or moving image) input by the external device 6. The external device 6 may include a server. The external device 6 may be any device that inputs an external image to the display apparatus 2 and is controllable by the display apparatus 2 based on contact coordinates. The external image transmitted from the external device 6 to the display apparatus 2 may be a desktop screen or a screen of any application. That is, the screen displayed by the external device 6 is the external image. Accordingly, the external image depends on what application the external device 6 is executing. The external image of the present embodiment further includes an image which is not displayed by the external device 6 but can be transmitted to the display apparatus 2 as long as an operation such as replay or pause of the image can be received based on the contact coordinates.

The background image layer D is a layer of a pre-stored image such as a solid image or a grid image that serves as a background for a hand drafted input. Note that an image stored in advance such as a saved still image is usable as a background image.

The display apparatus 2 can also selectively display the four layers. For example, one or more of the UI image layer A, the stroke image layer B, the output image layer C, and the background image layer D can be displayed.

Display Example of External Image

Figure 5A:
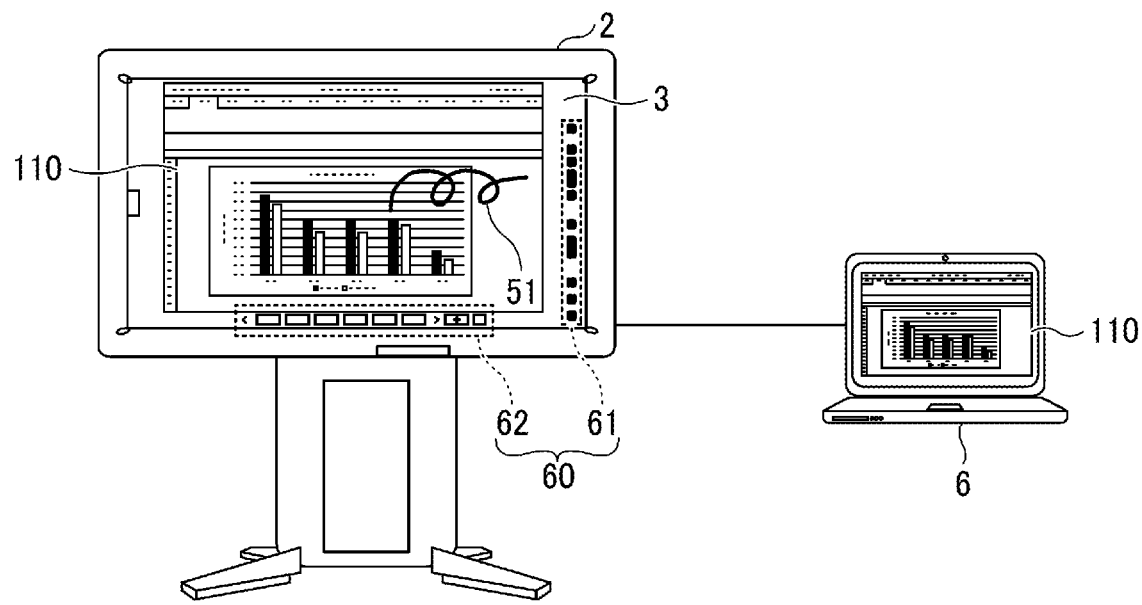
FIG. 5A and FIG. 5B are diagrams each illustrating a display example of an external image.
Figure 5B:
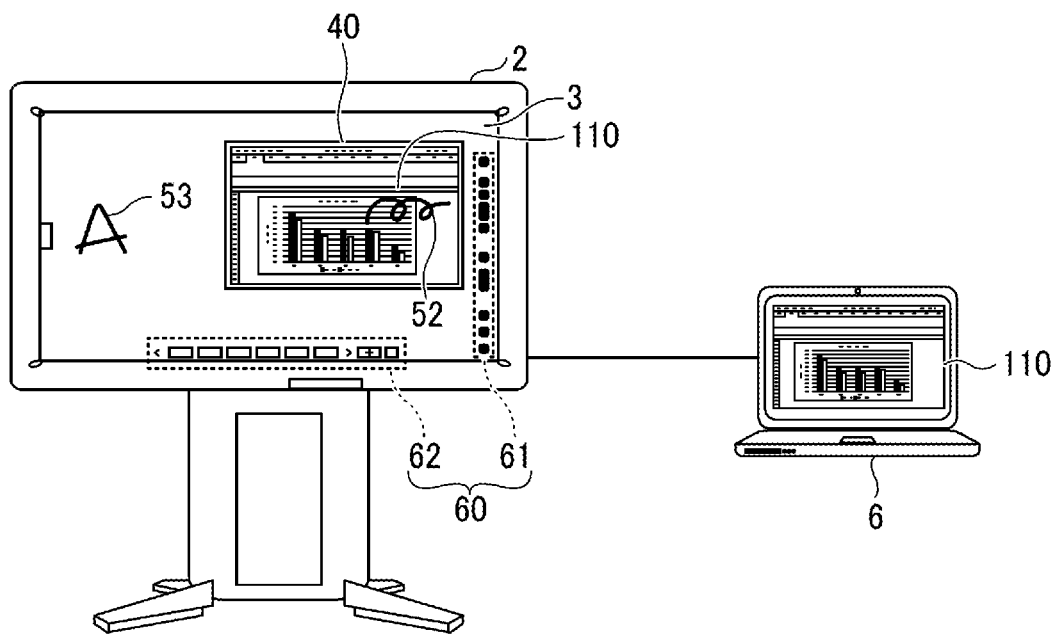

FIG. 5A and FIG. 5B are diagrams each illustrating a display example of the external image. In FIG. 5A, the display apparatus 2 displays an external image 110 on the entire screen of the display 3. In FIG. 5B, the display apparatus 2 displays the external image 110 in a partial region 40 of the screen of the display 3. The partial region 40 is a region where the external image 110 is displayed.

According to the present embodiment, even if the user does not explicitly switch the input mode between the hand drafted input of strokes and the operation for controlling the external device 6, the display apparatus 2 allows the following operations.

In either case of FIGS. 5A and 5B, the user can handwrite stroke data 51 or 52 on the external image 110 using the stylus pen 4.

Further, in FIG. 5B, the user can handwrite stroke data 53 using the finger 11 or the stylus pen 4 in a region other than the partial region 40 in which the external image 110 is displayed.

The user can control the external device 6 by performing a gesture with the finger 11 relative to the partial region 40 in which the external image 110 is displayed.

Note that the display apparatus 2 can also convert the stroke data 51 and 52 into text data, a shape, or a table. The stroke data 51 and 52 once handwritten in the partial region 40 can be moved, enlarged, or reduced.

As illustrated in FIGS. 5A and 5B, menu areas 60 corresponding to the UI image layer A are provided at the right end and the lower end of the display 3. In the menu area 60 at the right end, buttons 61 operated by the user are displayed. The buttons 61 are buttons that are frequently used by the user for, for example, setting the format or style of stroke data (e.g., color, thickness, and line type) and network setting, and for performing undo, redo, and eraser operations. In the menu area 60 at the lower end, page information 62 related to the page is displayed. A "page" is a content displayed on one screen of the display 3. When the display apparatus 2 receives hand drafted input by the user of strokes in an area exceeding the size of the display 3, the entire area covering the strokes is referred to as a page. The page information 62 is a thumbnail image of each page, a new page addition button, or the like. The user can move the positions of the buttons 61 and the page information 62.

The user can manually switch the display mode of the display apparatus 2 between the mode illustrated in FIG. 5A in which the external image 110 is displayed on the entire screen and the mode illustrated in FIG. 5B in which the external image 200 is displayed in the partial region 40. In addition, the user can move the position where the partial region 40 is displayed as illustrated in FIG. 5B and can enlarge or reduce the size of the partial region 40.

Functions

Figure 6:
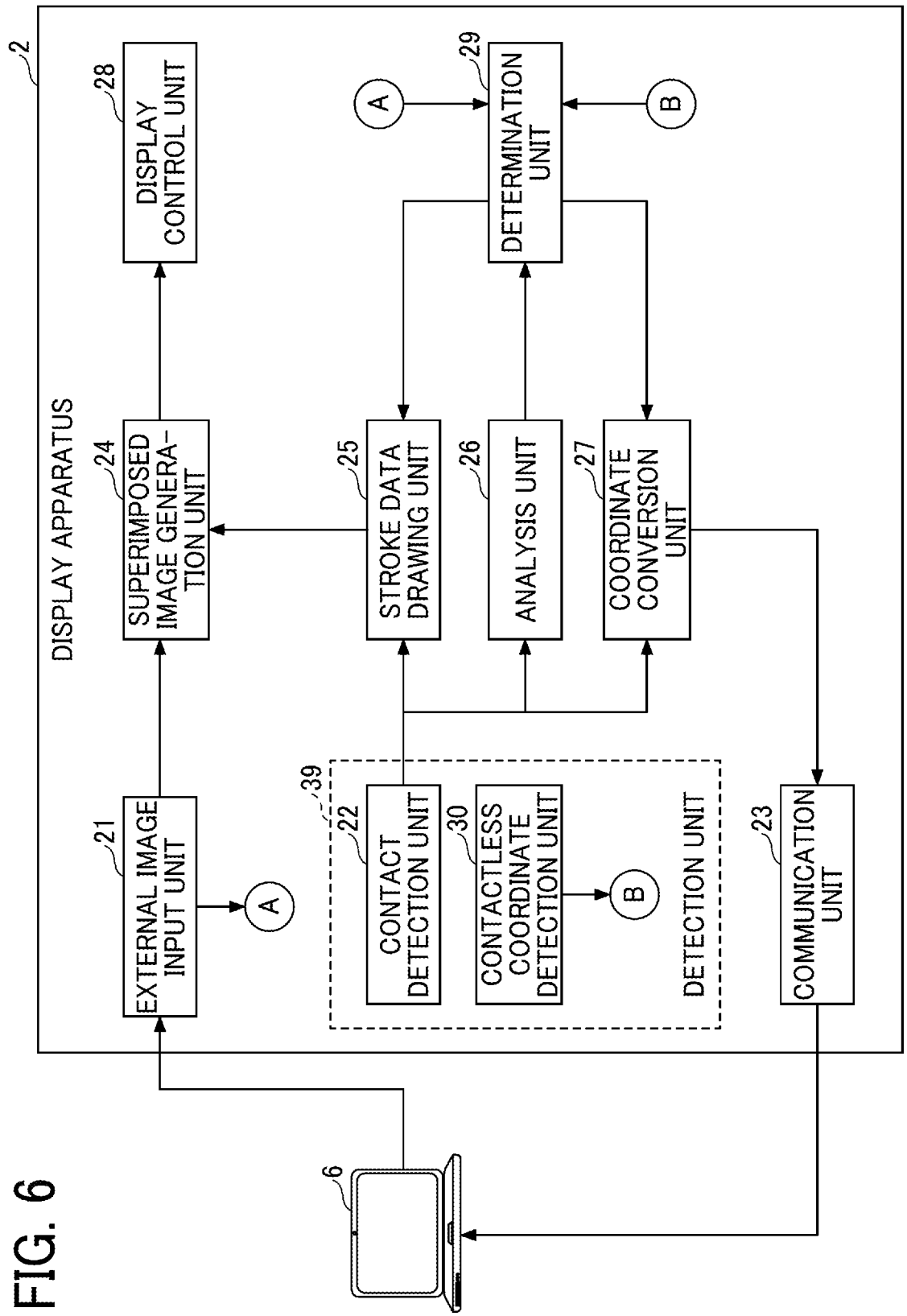
FIG. 6 is a block diagram illustrating a functional configuration of a display apparatus according to an embodiment.

FIG. 6 is a block diagram illustrating an example of a functional configuration of the display apparatus 2 according to the present embodiment. As illustrated in FIG. 6, the display apparatus 2 includes an external image input unit 21, a contact detection unit 22, a communication unit 23, a superimposed image generation unit 24, a stroke data drawing unit 25, an analysis unit 26, a coordinate conversion unit 27, a display control unit 28, a determination unit 29, and a contactless coordinate detection unit 30. These functional units of the display apparatus 2 are implemented or are caused to function by, for example, operation of one or more of the hardware components illustrated in FIG. 3 in corporation with instructions from the CPU 201 according to a program loaded from the SSD 204 to the RAM 203.

The external image input unit 21 is implemented by, for example, execution of a program by the CPU 201 and the capture device 211 and receives input of an external image continuously transmitted by the external device 6. The input external image is mainly an image of a screen displayed on the display 15 (see FIG. 3) of the external device 6, but, alternatively, a content stored by the external device 6 may be transmitted to the display apparatus 2. The external image input unit 21 inputs the external image to the superimposed image generation unit 24.

Note that the external image input unit 21 may receive input of an external image transmitted through communication of, for example, a wireless LAN, a wired LAN, or MIRACAST.

The contact detection unit 22 is implemented by execution of a program by the CPU 201, the contact sensor 214, and the like, and detects the contact coordinates, which are coordinates of the portion of the display in contact with the stylus pen 4 or the finger 11. The contact detection unit 22 detects the coordinates of a range having a margin corresponding to the thickness of the stylus pen 4 or the finger 11. The contact detection unit 22 inputs the contact coordinates to the stroke data drawing unit 25, the analysis unit 26, and the coordinate conversion unit 27. The contact detection unit 22 and the contactless coordinate detection unit 30 to be described later together serve as a detection unit 39.

The stroke data drawing unit 25 generates stroke data based on the contact coordinates input from the contact detection unit 22. The stroke data drawing unit 25 interpolates the contact coordinates input in time series and generates stroke data of having a thickness and a color set by, for example, the user. The stroke data drawing unit 25 inputs the stroke data to the superimposed image generation unit 24. The stroke data drawing unit 25 may generate stroke data as a stroke image layer and input the stroke image layer to the superimposed image generation unit 24.

The superimposed image generation unit 24 superimposes (combines) the stroke data input from stroke data drawing unit 25 on the external image input from the external image input unit 21, to generate output data to be output to the display 3, and inputs the output data to the display control unit 28. The display control unit 28 controls the display 3 to display the output data. Note that the superimposed image generation unit 24 may generate and manage each image layer described above. The superimposed image generation unit 24 may generate an external image layer based on the external image input from the external image input unit 21 and superimposes (combines) the stroke image layer including the stroke data on the external image layer, to generate the output data to be output to the display 3, and output the output data to the display control unit 28.

The analysis unit 26 acquires information for determining whether the input means is the finger 11 or the stylus pen 4 and inputs the information to the determination unit 29. The information for determining includes the contact area of the input means, the presence or absence of a contact signal, the pressing force of the input means against the display, or whether two sets of contact coordinates (input means) are detected.

For example, the analysis unit 26 determines the area of contact of the stylus pen 4 or the finger 11 with the touch panel based on the contact coordinates having the margin, input from the contact detection unit 22. The area may be any correlated area, such as an area of a circumscribed rectangle of the contact coordinates, correlated with the contact coordinates having the margin. The contact signal is a signal received by the electronic pen controller 216 from the stylus pen 4 when the display 3 is pressed. The analysis unit 26 acquires the contact signal via the electronic pen controller 216. The pressing force is a pressure detected by the touch panel of the display 3. The analysis unit 26 acquires the pressing force from the contact detection unit 22. Regarding the two sets of contact coordinates, in a case where the contact sensor 214 is a multi-touch sensor, the analysis unit 26 can acquire as many contact coordinates as the number of sets of contact coordinates detected by the contact detection unit 22.

The determination unit 29 compares the contact area with the threshold value to determine whether a touch event (touch by the finger 11) or a pen event (touch by the stylus pen 4) has occurred. In general, the finger 11 is thicker than the stylus pen 4. Accordingly, the determination unit 29 determines that the finger 11 has touched when the contact area is equal to or greater than the threshold value, and determines that the stylus pen 4 has touched when the contact area is less than the threshold value. The determination unit 29 determines that a touch event (touch by the finger 11) has occurred when a contact signal is not received, and determines that a pen event (touch by the stylus pen 4) has occurred when a contact signal is received. Further, the determination unit 29 determines that the input means is the finger 11 when the pressing force is smaller than the threshold value, and determines that the input means is the stylus pen 4 when the pressing force is equal to or greater than the threshold value. Further, the determination unit 29 determines that the input means is the fingers 11 when two sets of contact coordinates are detected substantially simultaneously, and determines that the input means is the stylus pen 4 otherwise.

The coordinate conversion unit 27 converts the contact coordinates on the display 3 into coordinates on the display 15 of the external device 6. The details of the conversion will be described with reference to FIG. 7. The coordinate conversion unit 27 inputs the converted contact coordinates to the communication unit 23.

The communication unit 23 transmits the converted contact coordinates to the external device 6 via the communication cable 10*a*3. The external device 6 receives the converted contact coordinates, and receives an operation for controlling the OS or an application executing on the external device 6. The OS of the external device 6 can receive a direct operation, using a pointing device, input to the own device in which the OS operates. The pointing device is a device or a function, such as a mouse, a trackball, or a touch panel, which receives an operation of designating coordinates. Accordingly, the external device 6 can handle the contact coordinates in the same manner as the operation using the pointing device input to the own device without a special application for processing the contact coordinates. FIG. 8 illustrates an example of operations that can be received by the external device 6 with the contact coordinates.

The contactless coordinate detection unit 30 detects, as contactless coordinates, the coordinates of a portion of the display 3 above which the input means hovers. In other words, the contactless coordinate detection unit 30 detects, as the contactless coordinates, the coordinates, in a space above the display 3, of the input means at a distance smaller than the threshold value from the display 3 and not in contact with the display 3 (e.g., before the input means touches). The term "hover operation" refers to such an operation performed by a user with the finger 11 or the stylus pen 4 floating without touching the screen. The display apparatus 2 can receive a hover operation. The details will be described with reference to Embodiment 2.

Note that the external device 6 may or may not be capable of receiving a hover operation. A hover operation in the external device 6 is, for example, the same operation as mouseover in which a pointer or cursor is superimposed on an object with a mouse.

Figure 7:
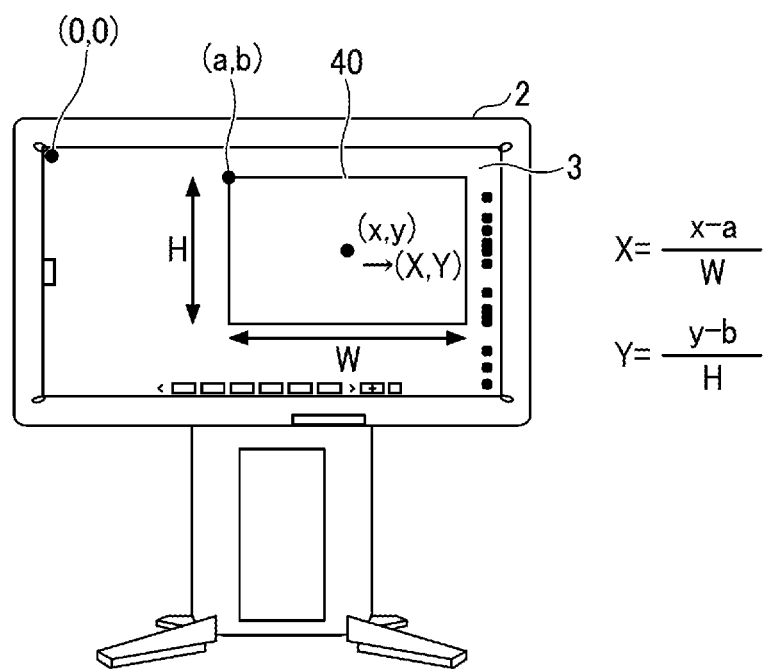
FIG. 7 is a diagram illustrating an example of a method for conversion from contact coordinates on a display to coordinates on a display of an external device.

Conversion from Contact Coordinates on Display to Contact Coordinates on External Device Display FIG. 7 is a diagram illustrating a method for converting contact coordinates on the display 3 to coordinates on the display 15 of the external device 6. For example, the origin (0,0) of the coordinates on the display 3 is set to the upper left corner of the screen of the display apparatus 2. The coordinates of the upper left corner of the partial region 40 in which the external image is displayed are specified as (a,b). The partial region 40 has a height H and a width W. From the description above, given coordinates (x,y) in the partial region 40 are converted into coordinates (X,Y) of the display 15 of the external device 6 as follows.

$$X = (x-a)/W$$

$$Y = (y-b)/H$$

The coordinate conversion unit 27 converts the contact coordinates on the display 3 into the coordinates on the display 15 of the external device 6 using these equations. When the external image is displayed on the entire screen of the display 3, the coordinate conversion unit 27 may not perform the coordinate conversion. For example, when the display 3 of the display apparatus 2 and the display 15 of the external device 6 have the same number of pixels, the coordinate conversion is unnecessary.

Alternatively, when the external device 6 has the information on the number of pixels of the display 3, the external device 6 can perform coordinate conversion.

Example of Operation Receivable by External Device with Contact Coordinates

FIG. 8 illustrates an example of operations that can be received by the external device 6 based on the contact coordinates transmitted from the display apparatus 2. Note that it is not necessary that all of the operations illustrated in FIG. 8 are receivable. It is assumed that the external device 6 can be controlled using either the stylus pen 4 or the finger 11, and these are collectively referred to as an input means in the present disclosure.

"Tap" refers to an operation of lightly touching an object on the screen with one input means and separating the input means from the object. In a mouse, this operation is called a click.

"Press and hold" refers to an operation of keeping touching an object on the screen with one input means and separating the input means from the object after a circle is displayed. Then, a right click menu is displayed. In the case of a mouse, this operation is called a right click.

"Press and tap" refers to an operation of, while touching an object on the screen with one input means, tapping the screen with another input means. Then, a right click menu is displayed. In the case of a mouse, this operation is called a right click.

"Double tap" refers an operation of tapping twice in succession an object on the screen with an input means. This is used for the user to open a folder or executes a program. In the case of a mouse, this operation is referred to as a double click.

"Drag" refers to an operation of touching an object on the screen with an input means, moving the input means to a target place without separating the input means from the object, and separating the input means from the object. This is used for moving an icon or selecting a range, for example. In the case of a mouse, this operation is called a drag.

"Pan" refers to an operation of moving an input means that is lightly touching the screen. This is an operation of moving a large page or image that is partly hidden, to display the hidden portion on the screen. In the case of a mouse, this operation is called scrolling.

"Flick" refers to an operation of touching the screen with an input means and moving the input means so as to sweep the screen. The display contents are scrolled in the direction in which the input means is moved. This operation is used for turning the page.

"Zoom" refers to an operation of enlarging or reducing. The enlarging is to widen the interval, and the reducing is to narrow the interval. For enlarging, touch the screen with one input means while touching the screen with another input means, and move the two input means so as to increase the interval therebetween. On the other hand, for reducing, move the two input means so as to pinch the screen. In the case of a mouse, this operation corresponds to the operation of Ctrl+scroll wheel.

"Rotation" refers to an operation of, while touching the screen with a first input means (e.g., one finger), touching the screen with a second input means (e.g., another finger) and moving the second input means to draw a circle around the first input means.

Example of Determination of Input Means

Contact Area

Next, a method of determining the input means will be described with reference to FIGS. 9A to 12. FIGS. 9A and 9B are diagrams illustrating a method for the determination unit 29 to determine the input means (the stylus pen 4 or the finger 11) based on an area where the input means is in contact with the display 3.

FIG. 9A illustrates a contact area 65 in a case where the input means is the finger 11, and FIG. 9B illustrates a contact area 66 in a case where the input means is the stylus pen 4. In the case where the input means is the finger 11, which has a rounded tip, the tip of the finger 11 is deformed by the reaction of the finger 11 from the display 3, and the finger 11 contacts the display 3 in the contact area 65 that is wider. In the case where the input means is the stylus pen 4, which has a tapered tip and is not easily deformed by a reaction from the display 3, the stylus pen 4 contacts the display 3 in the contact area 65 that is smaller. Accordingly, the determination unit 29 can determine whether the input means is the stylus pen 4 or the finger 11 by comparing the contact area 65 or 66 with the threshold value. The threshold value may be appropriately determined, and may be, for example, 10 [$mm^2$]. When the contact area 65 is equal to or larger than the threshold value, the determination unit 29 determines that the input means is the finger 11 and when the contact area 65 is smaller than the threshold value, the determination unit 29 determines that the input means is the stylus pen 4. The threshold value may be a width of the contact range (e.g., a maximum width or maximum diameter of the contact range).

In the determination based on the contact area, the determination unit 29 is capable of not only distinguishment between the finger 11 and the stylus pen 4 but also distinguishment between a relatively thin stylus pen 4 (an example of a first rod-shaped member) and a relatively thick stylus pen 4 (an example of a second rod-shaped member).

Presence or Absence of Contact Signal

Figure 10A:
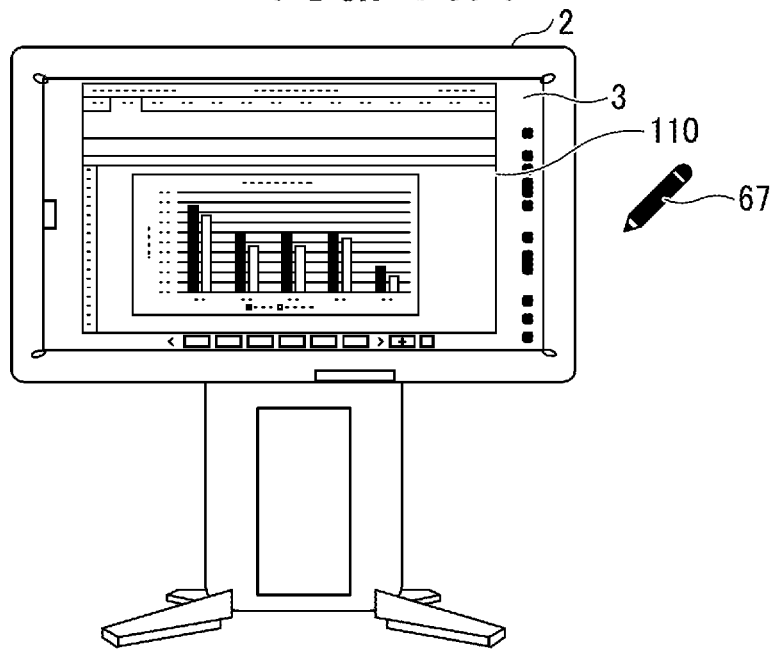
FIGS. 10A and 10B are diagrams illustrating an example of a method for the determination unit to determine the input means by using a fact that a stylus pen can communicate with a display apparatus.
Figure 10B:
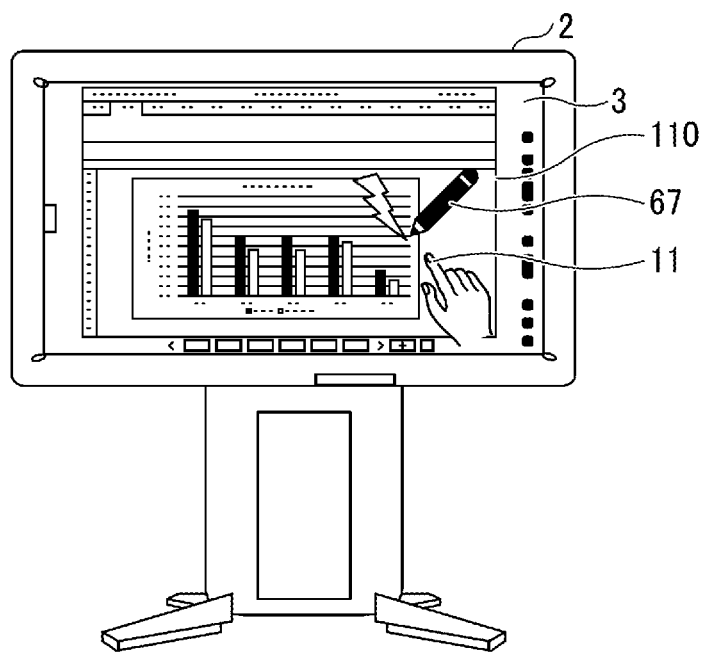

Next, referring to FIGS. 10A and 10B, a description will be given of a method of determining the input means based on the presence or absence of a contact signal. FIGS. 10A and 10B are diagrams illustrating a method for the determination unit 29 to determine the input means (the stylus pen 4 and the finger 11) by using the fact that the stylus pen 4 can communicate with the display apparatus 2. In FIGS. 10A and 10B, as an example of the stylus pen 4, an electronic pen 67 having a built-in battery is illustrated.

The electronic pen 67 has a movable portion at its tip, and the movable portion moves in the longitudinal direction of the electronic pen 67 when the electronic pen 67 comes into contact with the display 3. The movable portion comes into contact with a contact detection sensor by the movement. An elastic member such as a spring is provided between the movable portion and the contact detection sensor. When the movable portion is separated from the display 3, the movable portion returns to its original position by the elastic force thereof.

The contact detection sensor is a sensor that detects that the movable portion is in contact with the display 3.

The contact detection sensor may be, for example, a pressure sensor. When the movable portion comes into contact with the contact detection sensor, the resistance value of the current in the contact detection sensor changes. When a microcomputer included in the electronic pen 67 detects a change in the resistance value, the microcomputer converts the change in the resistance value into a voltage and further converts the voltage into a contact signal having a digital value. The electronic pen 67 transmits the contact signal to the display apparatus 2. The contact signal may include, for example, identification information for identifying the electronic pen 67.

Accordingly, when the electronic pen 67 is not in contact with the display 3 as illustrated in FIG. 10A, the display apparatus 2 does not receive the contact signal. When the electronic pen 67 is in contact with the display 3 as illustrated in FIG. 10B, the display apparatus 2 receives a contact signal. When the finger 11 is in contact with the display 3 as illustrated in FIG. 10B, the display apparatus 2 does not receive the contact signal. From the above, the determination unit 29 can determine the input means as follows.

When the analysis unit 26 detects a touch of the input means on the display 3 but does not receive a contact signal, the determination unit 29 determines that the input means is the finger 11.

When the analysis unit 26 detects a touch of the input means on the display 3 and receives a contact signal, the determination unit 29 determines that the input means is the stylus pen 4.

Pressing Force

Figure 11A:
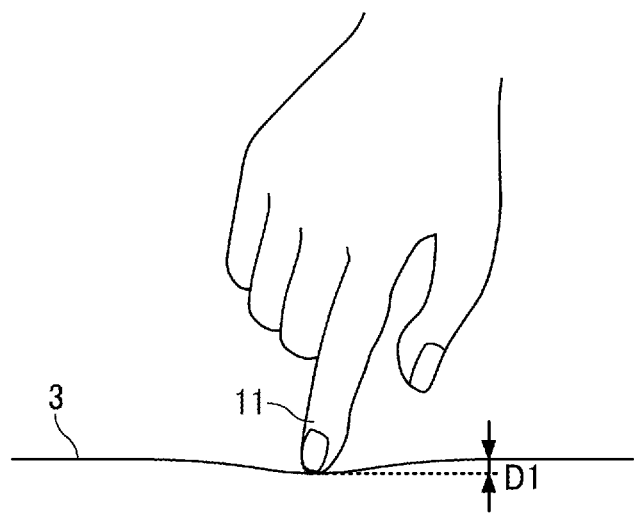
FIGS. 11A and 11B are diagrams illustrating an example of a method for the determination unit to determine the input means based on a pressing force applied to the display.
Figure 11B:
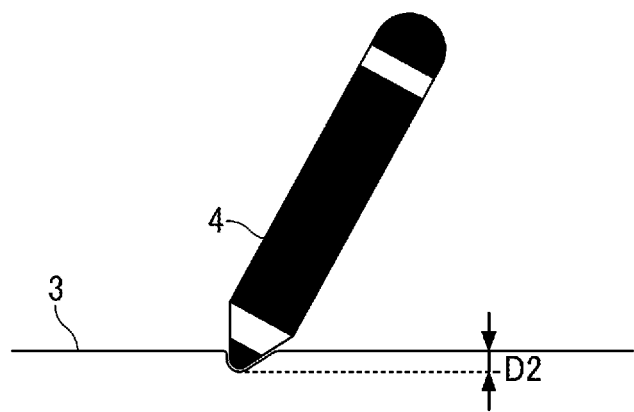

Next, with reference to FIGS. 11A and 11B, a description will be given of a method of determining the input means based on the pressing force. As illustrated in FIGS. 11A and 11B, when the display 3 includes a pressure sensor, the input means can be determined by the pressing force. FIGS. 11A and 11B are diagrams illustrating a method for the determination unit 29 to determine the input means (the stylus pen 4 or the finger 11) based on the pressing force applied to the display 3.

FIG. 11A illustrates a deformation amount D1 of the display 3 caused by the finger 11 as the input means. FIG. 11B illustrates a deformation amount D2 of the display 3 caused by the stylus pen 4 as the input means. In the case where the input means is the finger 11, which has a rounded tip, the tip of the finger 11 is deformed by the reaction of the finger 11 from the display 3, and the finger 11 contacts the display 3 in a relatively wide contact area. Accordingly, the display 3 is shallowly deformed in a relatively wide range in accordance with the size of the finger 11 (the deformation amount D1 is smaller). In this case, the pressing force is relatively small. In the case where the input means is the stylus pen 4, which has a tapered tip and is not easily deformed by a reaction from the display 3, the stylus pen 4 contacts the display 3 in a relatively small contact area. Accordingly, the display 3 is deeply deformed in a small range (the deformation amount D2 is greater). In this case, the pressing force is large. Accordingly, the determination unit 29 can determine whether the input means is the stylus pen 4 or the finger 11 by comparing the pressing force with the threshold value. The determination unit 29 determines that the input means is the finger 11 when the pressing force is smaller than the threshold value, and determines that the input means is the stylus pen 4 when the pressing force is equal to or greater than the threshold value.

In the determination based on the pressing force, the determination unit 29 is capable of not only distinguishment between the finger 11 and the stylus pen 4 but also distinguishment between a stylus pen 4 having a relatively thin tip (an example of a first rod-shaped member) and a stylus pen 4 having a relatively thick tip (an example of a second rod-shaped member). Specifically, the first rod-shaped member includes a tip having a first thickness, and the second rod-shaped member includes a tip having a second thickness greater than the first thickness. The ranges of the first and second thickness are stored in a memory, for example, by a manufacturer based on empirical data.

Number of Contact Coordinates

Figure 12:
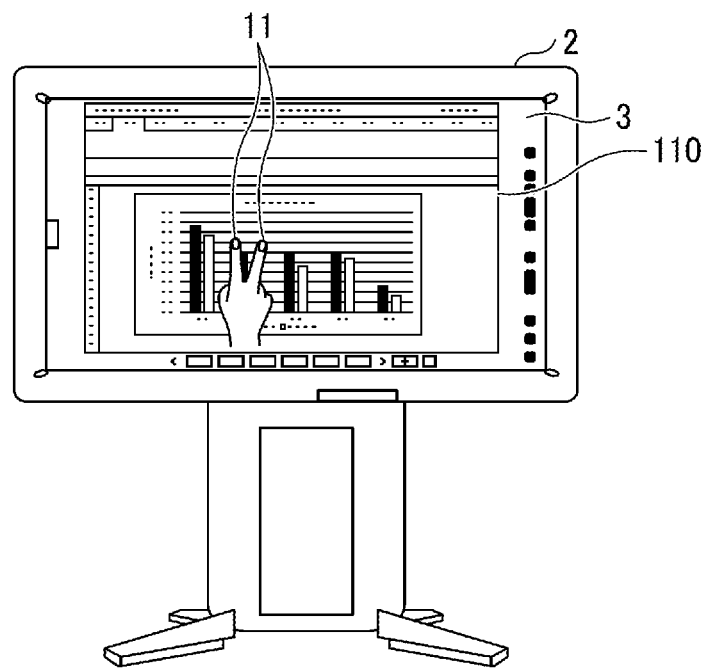
FIG. 12 is a diagram illustrating an example of a method for determining that the input means is fingers when two input means are detected.

Next, referring to FIG. 12, a description will be given of a method for determining an input means based on the number of contact coordinates. FIG. 12 is a diagram illustrating a method for determining that the input means is the finger 11 when two input means (contact coordinates) are detected. There is a case where the user operates the external image 110 with two fingers 11, for example, for zooming. Since it is rare for the user to perform zooming with two stylus pens 4, the determination unit 29 can determine that the input means is the fingers 11 when two input means are detected.

Note that a plurality of users may have their respective stylus pens 4 and touch the display 3 with their respective stylus pens 4. However, it is rare that the plurality of users touches the display 3 with their respective stylus pens 4 substantially simultaneously. Accordingly, the determination unit 29 may determine that the input means is the fingers 11 when two input means touch the display 3 substantially simultaneously. The expression like "substantially simultaneously" means that the timing difference is small (for example, less than 1 second) and can be regarded as being at the same time. Alternatively, the determination unit 29 may determine that the input means is the fingers 11 when the distance between the contact coordinates of the two input means is within a threshold distance.

On the other hand, when one input means (one set of contact coordinates) is detected, the determination unit 29 may determine that the input means is the stylus pen 4. However, one input means (one set of contact coordinates) detected is not always the stylus pen 4. Therefore, it is desirable that the determination based on the number of input means is combined with the determination based on the contact area or presence or absence of contact signal.

When the user touches the display 3 with three or more fingers 11, processing may be performed in the same manner as the case of two fingers 11.

Determination Process of Input Means

Next, with reference to FIGS. 13 to 16, a description will be given of a process of determining the input means, performed by the determination unit 29.

Determination Process Based on Contact Area

Figure 13:
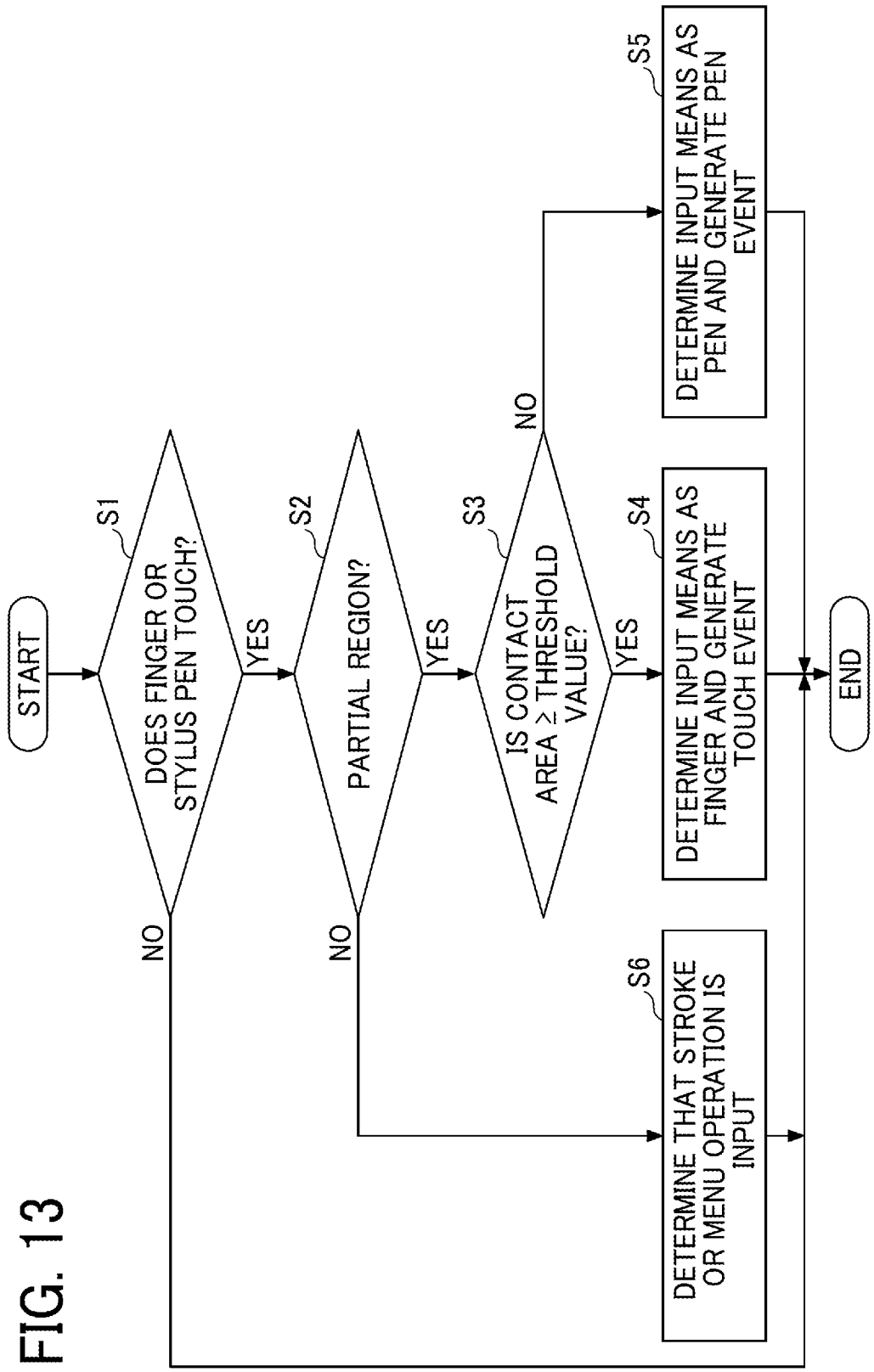
FIG. 13 is a flowchart illustrating an example of a process of determining whether the input means is a stylus pen or a finger based on the contact area.

FIG. 13 is a flowchart illustrating a process of determining whether the input means is the stylus pen 4 or the finger 11 based on the contact area. The process of FIG. 13 is executed, for example, when the power of the display apparatus 2 is turned on.

The analysis unit 26 determines whether the finger 11 or the stylus pen 4 touches the display 3 based on an input from the contact detection unit 22 (or absence of the input from the contact detection unit 22) (S1). When the result of the determination of S1 is No, the process of FIG. 13 ends.

In a case where the determination in Step S1 is Yes, the analysis unit 26 determines whether the partial region 40 (see FIG. 7) is touched (S2). Since the partial region 40 is an area in which the external image is displayed, the coordinates thereof are known. When the determination in Step S2 is No, that is, the input is made to a region other than the partial region 40, it is determined that the touch is for inputting strokes or for operating a menu irrespective of whether the input means is the finger 11 or the stylus pen 4 (S6).

When the determination in Step S2 is Yes, the determination unit 29 determines whether the contact area of the input means is equal to or greater than the threshold value (S3). Determining that the contact area of the input means is equal to or greater than the threshold value means that the predetermined condition (first condition) is satisfied. Determining that the contact area of the input means is smaller than the threshold value means that the predetermined condition is not satisfied.

When the contact area is equal to or greater than the threshold value, the determination unit 29 determines that the input means is the finger 11 and generates a touch event (S4). In addition, in the display apparatus 2 that treats a touch of a side of a hand (along a contour of a palm) as an eraser, the determination unit 29 may determine that the contact area is equal to or greater than the threshold value and smaller than a certain value.

When the contact area is smaller than the threshold value, the determination unit 29 determines that the input means is the stylus pen 4 and generates a pen event (S5).

According to the process of FIG. 13, even if the stylus pen 4 is not a battery-operated electronic pen or the like, the display apparatus 2 can determine whether the input means is the finger 11 or the stylus pen 4, which the user selectively uses.

Figure 14:
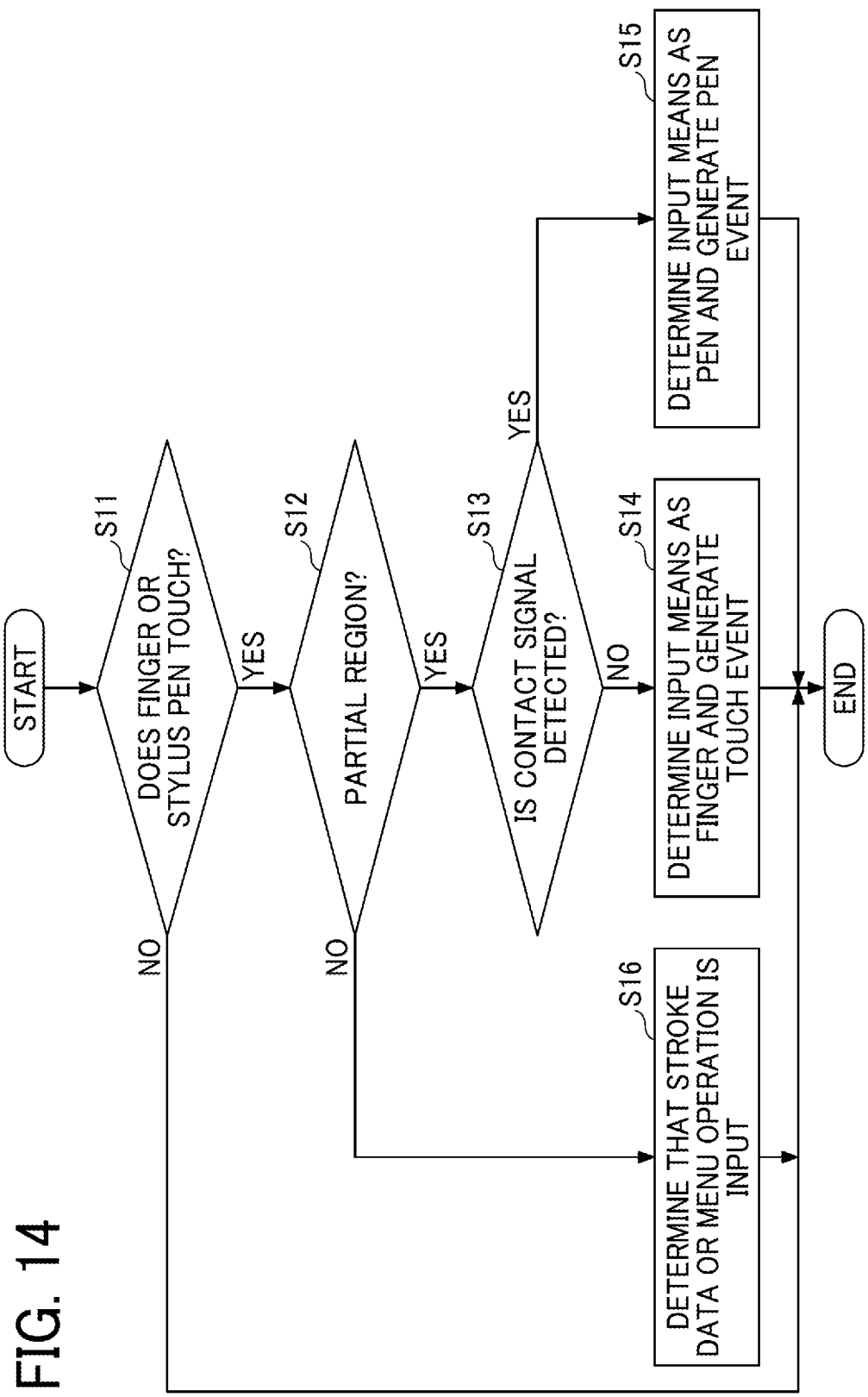
FIG. 14 is a flowchart illustrating an example of a process of determining whether the input means is a stylus pen or a finger based on the presence or absence of a contact signal.

Determination Process based on Presence or Absence of Contact Signal FIG. 14 is a flowchart illustrating a process of determining whether the input means is the stylus pen 4 or the finger 11 based on the presence or absence of a contact signal. In the description with reference to FIG. 14, differences from FIG. 13 will mainly be described. The operations in steps S11, S12, and S16 are similar to those in steps S1, S2, and S6 in FIG. 13.

In Step S13, the determination unit 29 determines whether a contact signal is received (S13). Determining that the contact signal is not received means that the predetermined condition is satisfied.

Determining that the contact signal is received means that the predetermined condition is not satisfied.

When the contact signal is not received, the determination unit 29 determines that the input means is the finger 11 and generates a touch event (S14).

When the contact signal is received, the determination unit 29 determines that the input means is the stylus pen 4 and generates a pen event (S15).

According to the process of FIG. 14, when the stylus pen 4 is a battery-operated electronic pen or the like, the display apparatus 2 can determine whether the input means is the finger 11 or the stylus pen 4 without calculating the contact area.

The stylus pen 4 may be an electronic pen that transmits different signals to the display apparatus 2 depending on the portion (e.g., a pen tip or a pen bottom) of the electronic pen pressed to the display. In this case, for example, the determination unit 29 can determine a pen event based on a signal transmitted when the pen tip is pressed and determine a touch event based on a signal transmitted when the pen bottom is pressed. The display apparatus 2 can determine which of a touch event or a pen event is to be generated when the user selectively uses the pen tip and the pen bottom of one stylus pen 4.

The method of determining the input means based on the presence or absence of the contact signal can also be applied to a projector used as the display apparatus 2. The projector used as the display apparatus 2 projects an image on a standard whiteboard without a touch panel. The coordinates of the stylus pen 4 are determined by a camera having an optical axis parallel to the whiteboard and an ultrasonic wave transmitted from the stylus pen 4 only during writing. The direction of the stylus pen 4 is detected by the camera, and the distance is detected based on the arrival time of the ultrasonic wave. Since the coordinates of the stylus pen 4 are known, the projector can project stroke data. When the input means is a finger, ultrasonic waves are not transmitted. Thus, the determination unit 29 can determine the input means based on the presence or absence of ultrasonic waves.

Figure 15:
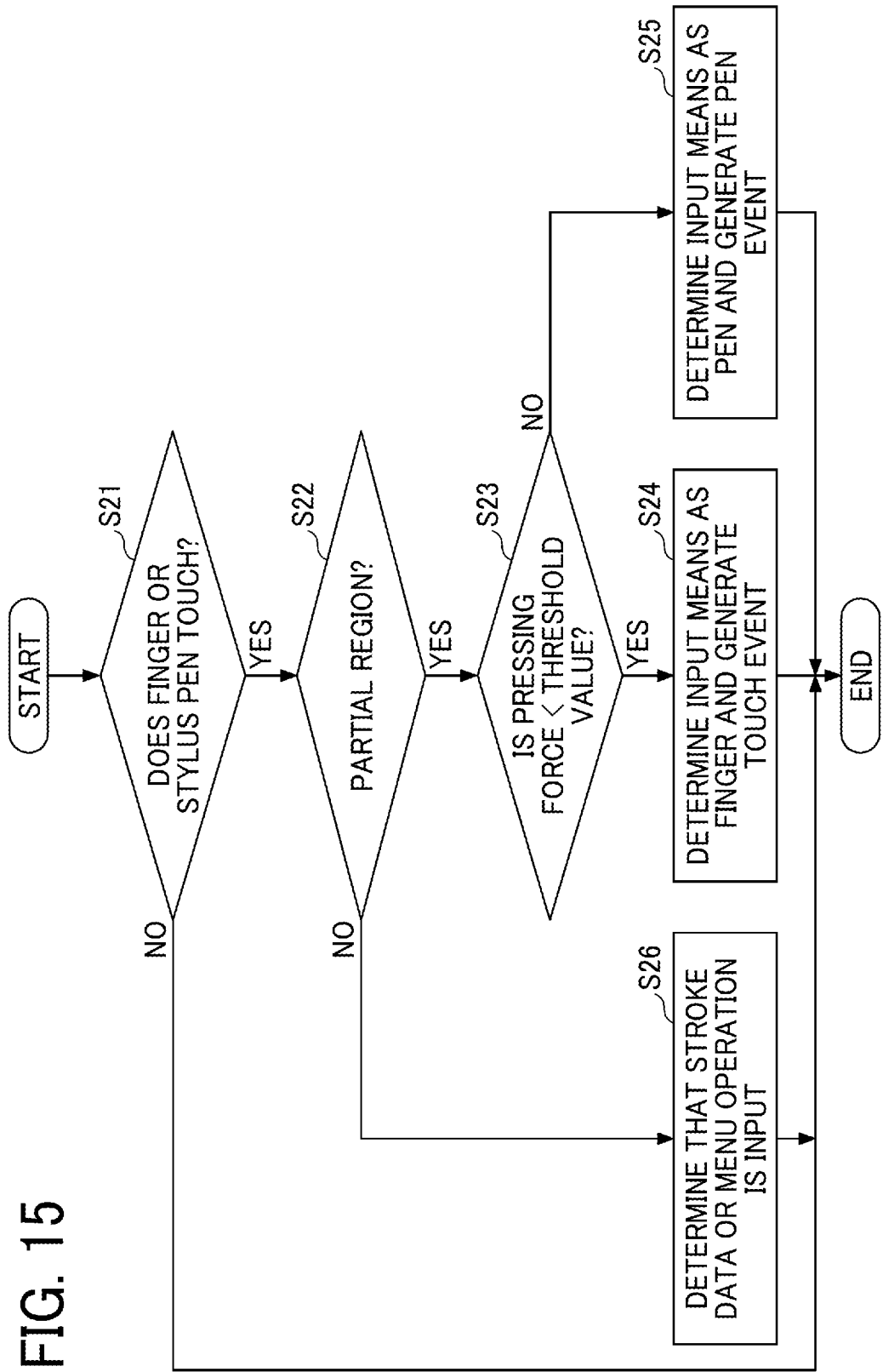
FIG. 15 is a flowchart illustrating an example a process of determining whether the input means is a stylus pen or a finger based on a pressing force.

Determination Process based on Pressing Force FIG. 15 is a flowchart illustrating a process of determining whether the input means is the stylus pen 4 or the finger 11 based on the pressing force. In the description with reference to FIG. 15, differences from FIG. 13 will mainly be described. The operations in steps S21, S22, and S26 are similar to those in steps S1, S2, and S6 in FIG. 13.

In Step S23, the determination unit 29 determines whether the pressing force is smaller than the threshold value (S23). Determining that the pressing force is smaller than the threshold value means that the predetermined condition is satisfied. Determining that the pressing force is not smaller than the threshold value means that the predetermined condition is not satisfied.

When the pressing force is smaller than the threshold value, the determination unit 29 determines that the input means is the finger 11 and generates a touch event (S24).

When the pressing force is not smaller than the threshold value, the determination unit 29 determines that the input means is the stylus pen 4 and generates a pen event (S25).

According to the process of FIG. 15, even if the stylus pen 4 is not a battery-operated electronic pen or the like, the display apparatus 2 can determine whether the input means is the finger 11 or the stylus pen 4, which the user selectively uses.

Determination Process Based on Number of Input Means

Figure 16:
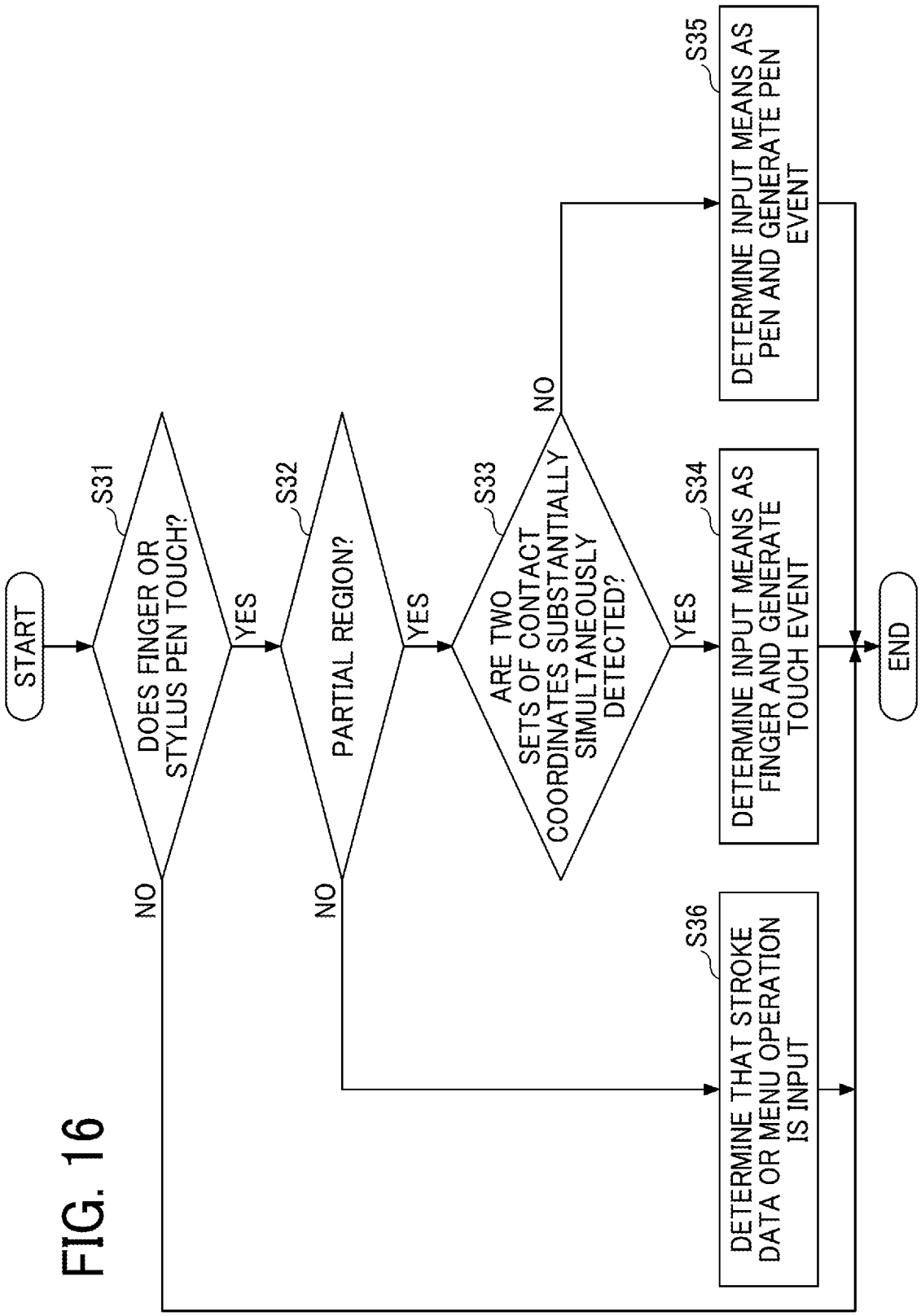
FIG. 16 is a flowchart illustrating an example of a process of determining whether the input means is a stylus pen or a finger based on whether two input means are detected.

FIG. 16 is a flowchart illustrating a process of determining whether the input means is the stylus pen 4 or the finger 11 based on whether the two input means are detected. In the description with reference to FIG. 16, differences from FIG. 13 will mainly be described. The operations in steps S31, S32, and S36 are similar to those in steps S1, S2, and S6 in FIG. 13.

In Step S33, the determination unit 29 determines whether two sets of contact coordinates are detected substantially simultaneously (S33). Determining that two sets of contact coordinates are detected substantially simultaneously means that the predetermined condition is satisfied. Determining that two sets of contact coordinates are not detected substantially simultaneously means that the predetermined condition is not satisfied.

When two contact coordinates are detected substantially simultaneously, the determination unit 29 determines that the input means is the finger 11 and generates a touch event (S34).

When the two contact coordinates are not detected substantially simultaneously, the determination unit 29 determines that the input means is the stylus pen 4 and generates a pen event (S35).

According to the process of FIG. 16, even if the stylus pen 4 is not a battery-operated electronic pen or the like, the display apparatus 2 can determine whether the input means is the fingers 11 or the stylus pen 4, which the user selectively uses.

Figure 17:
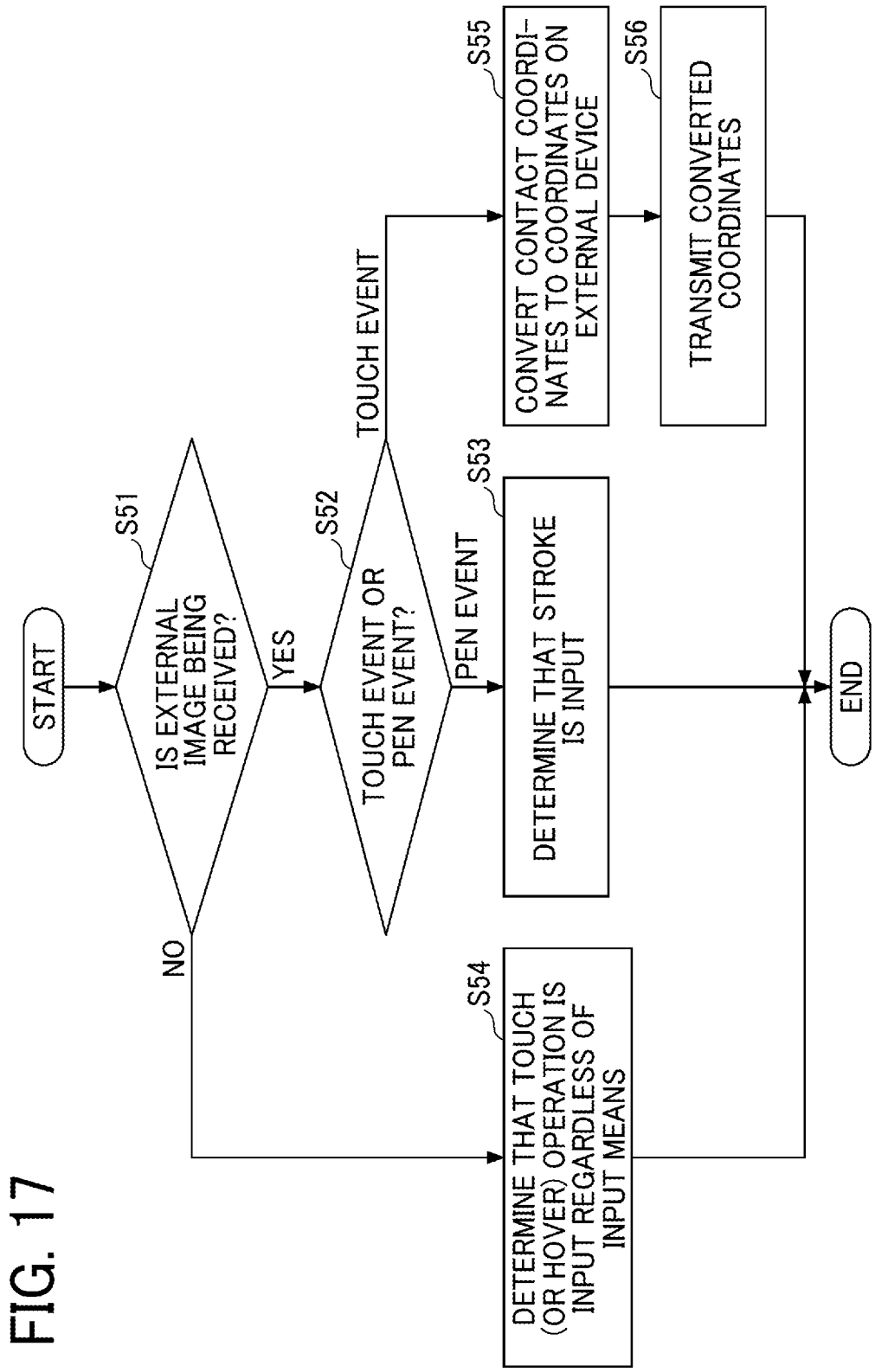
FIG. 17 is a flowchart illustrating an example of a process of switching between hand drafted input of strokes and transmission of contact coordinates to the external device in accordance with a touch event or a pen event.

Switching Between Hand Drafted Input of Stroke and Transmission of Contact Coordinates to External Device Next, a description will be given of a process of switching between hand drafted input of strokes and transmission of contact coordinates to the external device 6, with reference to FIG. 17. FIG. 17 is a flowchart illustrating a process of switching between hand drafted input of strokes and transmission of contact coordinates to the external device 6 in accordance with a touch event or a pen event. The process of FIG. 17 is executed, for example, when the power of the display apparatus 2 is turned on.

First, the determination unit 29 determines whether the external image input unit 21 is receiving an external image, that is, whether the display apparatus 2 is displaying a screen of the external device 6 (S51). When an external image is input to the external image input unit 21, the capture device 211 receives an image signal (video signal), and thus the determination can be made based on the presence or absence of the image signal. Whether an external image is input to the external image input unit 21 includes whether the cable 10al is connected to the display apparatus 2. In this case, the capture device 211 can determine whether the cable 10al is connected based on the voltage of a signal line for processing included in the cable 10al.

When the determination in Step S51 is No, the determination unit 29 determines that an operation received in the menu areas 60 (see FIGS. 5A and 5B) is a menu operation and determines that an operation received in a region of the entire display 3 other than the menu areas 60 is a pen event, regardless of the input means (S54).

When the determination in Step S51 is Yes, the determination unit 29 determines whether a touch event or a pen event has been detected (S52). Detection of a touch event means that the predetermined condition is satisfied. Detection of a pen event means that the predetermined condition is not satisfied.

When a pen event is detected (when the predetermined condition is not satisfied), the determination unit 29 determines that a stroke is input to the partial region 40 by hand drafted input (S53). The stroke data drawing unit 25 draws stroke data and inputs the stroke data to the superimposed image generation unit 24. When a pen event is detected (when a predetermined condition is not satisfied), the superimposed image generation unit 24 enables input to the stroke image layer and outputs, to the display control unit 28, the stroke image layer including the stroke data drawn based on the coordinates of the input means touched the touch panel so as to be superimposed on the external image layer. Then, the display control unit 28 displays the data output from the superimposed image generation unit 24.

When a touch event is detected (when the predetermined condition is satisfied), the determination unit 29 determines that an operation for controlling the external device 6 is input to partial region 40 (S55). The coordinate conversion unit 27 converts the contact coordinates on the display 3 into coordinates on the display 15 of the external device 6. When a touch event is detected (when the predetermined condition is satisfied), the superimposed image generation unit 24 does not enable input to the stroke image layer or disables input to the stroke image layer.

The communication unit 23 transmits, to the external device 6, the coordinates on the display 15 of the external device 6 converted from the contact coordinates on the display 3 (S56). In addition, the communication unit 23 may transmit, to the external device, the coordinates of the input means that has touched an external image region of the external image layer on the touch panel.

As described above, the display apparatus 2 determines whether a stroke is input to the partial region 40 or an operation for controlling the external device 6 is input based on whether a touch event or a pen event is performed on the partial region 40. Depending on the determination result, the display apparatus 2 performs the switching between hand drafted input of stroke data and transmission of contact coordinates to the external device 6. This configuration obviates a user operation for the switching between the hand drafted input and the operation for controlling the external device 6.

Embodiment 2

In the present embodiment, a description will be given of the display apparatus 2 that can determine whether the operation is for inputting strokes to the partial region 40 or controlling the external device 6, by using the fact that the display apparatus 2 can detect contactless coordinates. The predetermined condition of the present embodiment is whether the input means is in contact with the touch panel.

The hardware configuration illustrated in FIG. 3 and the functional configuration illustrated in FIG. 6 of the above-described embodiment are applicable to the present embodiment.

Figure 18A:
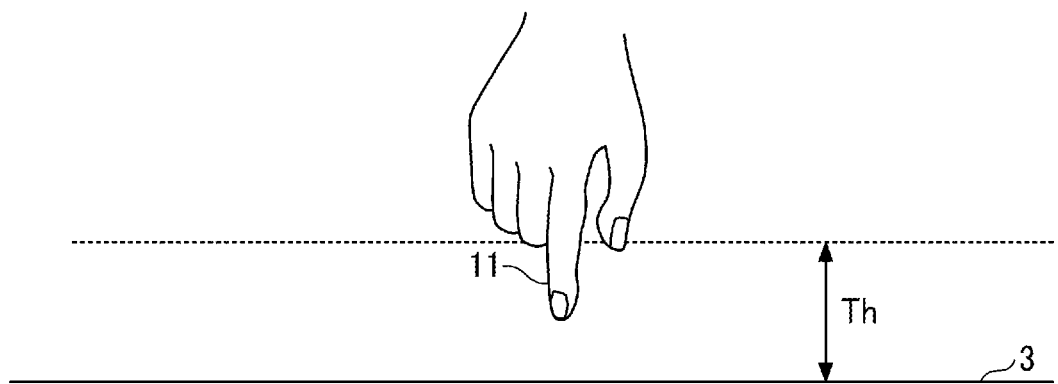
FIGS. 18A and 18B are diagrams illustrating an example of detection of coordinates of an input means that is contactless from a display.
Figure 18B:
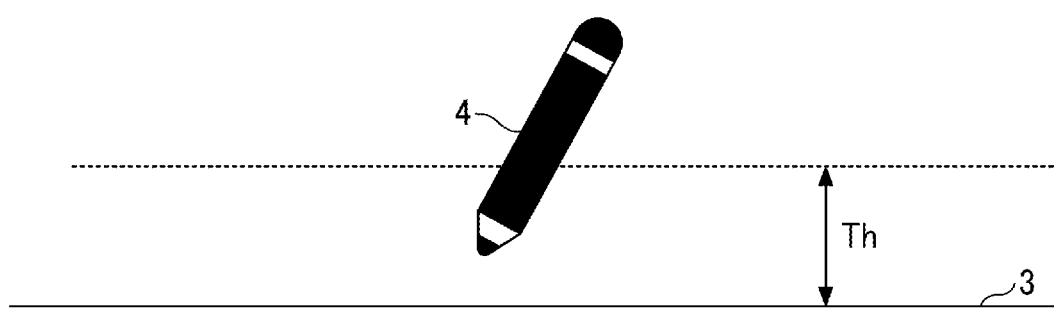

FIGS. 18A and 18B are diagrams illustrating detection of contactless coordinates of an input means that is hovering. FIG. 18A illustrates a case where the input means is the finger 11, and FIG. 18B illustrates a case where the input means is the stylus pen 4. A touch panel employing, for example, infrared blocking sensing can detect the contactless coordinates of the input means being contactless with the touch panel, regardless of whether the input means is the finger 11 or the stylus pen 4. In the case of capacitive sensing or electromagnetic induction sensing, similarly, the display apparatus 2 can detect the contactless coordinates based on a change in capacitance or voltage. Determining that the input means is contactless with the display means that the predetermined condition is satisfied. Determining that the input means is in contact with (or has contacted) the display means that the predetermined condition is not satisfied.

A description will be given of a method of determining that the finger 11 or the stylus pen 4 is in contact or not in contact with the display 3 in each sensing method.

In infrared blocking sensing, a contactless presence (contactless state) of the input means is detected when the display apparatus 2 detects a change from a state in which infrared light is not blocked to a state in which infrared light is blocked. When the display apparatus 2 receives a contact signal in a state where infrared rays are blocked (in this case, the input means is limited to the stylus pen 4), the display apparatus 2 detects a touch of the input means. Alternatively, when the contact sensor 214 detects an increase of certain value or greater in the capacitance or voltage, the display apparatus 2 detects a touch of the input means (in this case, the input means may be either the finger 11 or the stylus pen 4).

In capacitive sensing, the input means may be either the finger 11 or the stylus pen 4. In the case of the finger 11 (or the stylus pen 4 that does not transmit electromagnetic waves from its tip), the display apparatus 2 detects the contactless state of the input means when the contact sensor 214 detects a slight increase in capacitance or detects a capacitance equal to or smaller than a certain value. When the contact sensor 214 detects an increase of a certain amount or more in the capacitance from a state in which the contactless state is detected (the capacitance rapidly increases due to the touching), when a contact signal is received, or when capacitance of a certain amount or more is detected, the display apparatus 2 detects a touch of the input means. In a case of the stylus pen 4 that transmits an electromagnetic wave from the tip thereof, when the contact sensor 214 starts detecting the electromagnetic wave, the display apparatus 2 detects the contactless state of the input means. In a state where the electromagnetic wave is being detected, when the contact sensor 214 detects an increase of a certain amount or more in the capacitance (the capacitance rapidly increases due to the touching) or when a contact signal is received, the display apparatus 2 detects a touch of the input means.

In electromagnetic induction sensing, it is assumed that the input means is the stylus pen 4 that transmits an electromagnetic wave from the tip thereof. When the contact sensor 214 starts detecting an electromagnetic wave or while the contact sensor 214 detects an electromagnetic wave of equal to or smaller than a certain value, the display apparatus 2 detects the contactless state of the input means. In a state where the electromagnetic wave is being detected, when the contact sensor 214 detects an increase of a certain amount or more in the voltage (the voltage rapidly increases due to the touching), when a contact signal is received, or when an electromagnetic wave of a certain amount or more is detected, the display apparatus 2 detects a touch of the input means.

There are touch panels employing other types of sensing such as a resistive film method or an ultrasonic elastic wave method, and the touching and the contactless state may be detected by a method suitable for each sensing type.

As illustrated in FIGS. 18A and 18B, when the distance between the tip of the finger 11 or the stylus pen 4 and the display 3 is within a threshold distance Th, the contactless coordinate detection unit 30 detects the contactless coordinates of the finger 11 or the stylus pen 4. The determination unit 29 according to the present embodiment determines that the event is a touch event when the input means is not in contact with the display 3, and determines that the event is a pen event when the input means is in contact with the display 3.

In the case of detecting, by infrared blocking sensing, the approach of the finger 11 or the stylus pen 4, the threshold distance Th may be the same in FIGS. 18A and 18B. The threshold distance Th is the maximum height at which infrared light can be applied to and received from. In capacitive sensing, the threshold distance Th may be different depending on whether the input means is the finger 11 or the stylus pen 4. In capacitive sensing, the threshold distance Th is the maximum distance at which the contact sensor 214 can detect a change in capacitance.

In electromagnetic induction sensing, it is assumed that the input means is the stylus pen 4 as illustrated in FIG. 18B (the display apparatus 2 does not detect the approach of the finger 11 illustrated in FIG. 18A). In electromagnetic induction sensing, the threshold distance Th is the maximum distance at which the contact sensor 214 can detect an electromagnetic wave. Note that the threshold distance Th may be different among infrared blocking sensing, capacitive sensing, and electromagnetic induction sensing.

Accordingly, for controlling the external device 6, the user can perform an operation with either the finger 11 or the stylus pen 4 so as not to touch the partial region 40. Further, for hand drafted input to the partial region 40, the user can perform hand drafted input of strokes with either the finger 11 or the stylus pen 4 touching the partial region 40. The user can control the display apparatus 2 to switch between the hand drafted input of strokes and the operation for controlling the external device 6 without changing the input means from his/her finger 11 to the stylus pen 4 or vice versa.

Figure 19:
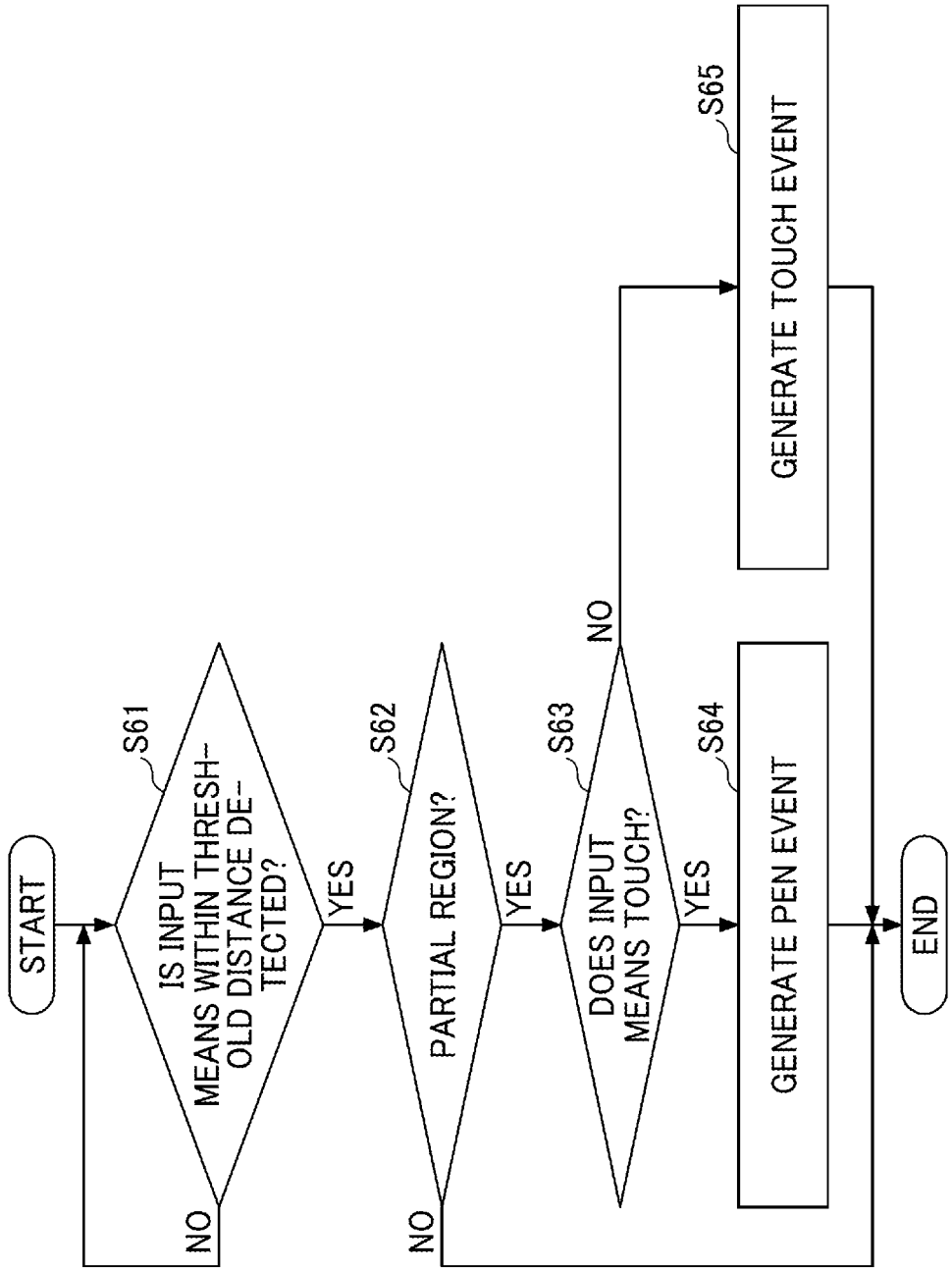
FIG. 19 is a flowchart illustrating an example of a process of determining whether the event is a touch event or a pen event, performed by the determination unit, according to whether the input means has touched the display.

FIG. 19 is a flowchart illustrating a process of determining whether the event is a touch event or a pen event, performed by the determination unit 29, according to whether the input means has touched the display 3. The process of FIG. 19 is executed while the display apparatus 2 is on.

First, the contactless coordinate detection unit 30 determines whether the input means approaching the display 3 within the threshold distance Th is detected. The contactless coordinate detection unit 30 detects the coordinates of the input means within the threshold distance Th (S61). At the time at which the contactless coordinate detection unit 30 detects the input means, the input means does not touch the display 3.

When the determination in Step S61 is Yes, the determination unit 29 determines whether the coordinates of the input means in the contactless state are included in the partial region 40 (S62). Since the partial region 40 is a region in which the external image is displayed, the coordinates thereof are known. When the determination in Step S62 is No, which means that a hover operation is performed on a region of the display 3 other than the partial region 40, no operation is performed or an operation corresponding to the contactless coordinates is received.

When the determination in Step S62 is Yes, the determination unit 29 determines whether the input means has touched the display 3 (S63). Determining that the input means approaches within the threshold distance Th and does not touch the display 3 means that the predetermined condition is satisfied. Determining that the input means touches the display 3 means that the predetermined condition is not satisfied.

When the input means touches the display 3, the determination unit 29 generates a pen event (S64).

When the input means is not in contact with the display 3, the determination unit 29 generates a touch event (S65).

Note that the input means is at least temporarily brought into the contactless state when the user inputs strokes and when the user inputs an operation for controlling the external device 6. Accordingly, even when the user tries to input strokes, the determination unit 29 may temporarily detect the contactless coordinates, and the communication unit 23 may transmit the contactless coordinates to the external device 6. In order to prevent such an undesirable detection, it is preferable that the determination unit 29 monitors the speed or acceleration of approach of the input means to the display 3 and determines whether the event is a touch event or a pen event based on whether the speed or acceleration of approach is greater than a threshold value. When the user tries to input strokes, the speed or acceleration of approach is larger, but, when the user tries to control the external device 6, the speed or acceleration of approach is smaller. Accordingly, the determination unit 29 can determine that the event is a pen event when the speed or acceleration of approach is equal to or greater than the threshold value, and the event is a touch event when the speed or acceleration of approach is smaller than the threshold value.

Alternatively, the determination unit 29 may determine the event is a touch event when the contactless state continues for a predetermined time or more.

The processing performed in a case where a touch event or a pen event is determined may be similar to that in FIG. 17 of Embodiment 1, as described below with reference to FIG. 17.

The determination unit 29 determines whether the external image input unit 21 is receiving an external image (S51). The determination may be the same as that in Embodiment 1.

When the determination in Step S51 is No, the determination unit 29 determines that a hover operation or a touch operation received in the menu areas 60 (see FIGS. 5A and 5B) is a menu operation regardless of the input means, and determines that an operation received in a region of the entire display 3 other than the menu areas 60 is a hover operation or a touch operation regardless of the input means (S54).

When the determination in Step S51 is Yes, the determination unit 29 determines whether a touch event or a pen event has been detected (S52).

When a pen event is detected, the determination unit 29 determines that a stroke is input to the partial region 40 by hand drafted input (S53). The stroke data drawing unit 25 draws stroke data and inputs the stroke data to the superimposed image generation unit 24.

When a touch event is detected, the determination unit 29 determines that an operation for controlling the external device 6 is input to partial region 40 (S55). The coordinate conversion unit 27 converts the contact coordinates on the display 3 into coordinates on the display 15 of the external device 6.

The communication unit 23 transmits, to the external device 6, the coordinates on the display 15 of the external device 6 converted from the coordinates on the display 3 (S56).

In the present embodiment, when a pen event is detected, the stroke data drawing unit 25 draws stroke data. By contrast, when a touch event is detected, the communication unit 23 transmits contact coordinates to the external device 6. However, this relationship may be reversed. The display apparatus 2 may transmit the contact coordinates to the external device when a pen event is detected and may draw stroke data in the partial region 40 when a touch event is detected. In this case, the definitions of the pen event and the touch event are switched from those in Embodiment 1 as follows. The term "pen event" refers to an event with which an operation for controlling the external device 6 is received based on contact coordinates or contactless coordinates. The term "touch event" refers to an event with which the input of stroke data is received based on contact coordinates.

According to the present embodiment, the display apparatus 2 can automatically switch between the hand drafted input to the partial region 40 and the operation for controlling the external device 6 depending on whether the input means is in the contactless state.

Embodiment 3

In the present embodiment, a description is given below of a display system in which the display apparatus 2 and a server on a network communicate with each other.

Figure 20:
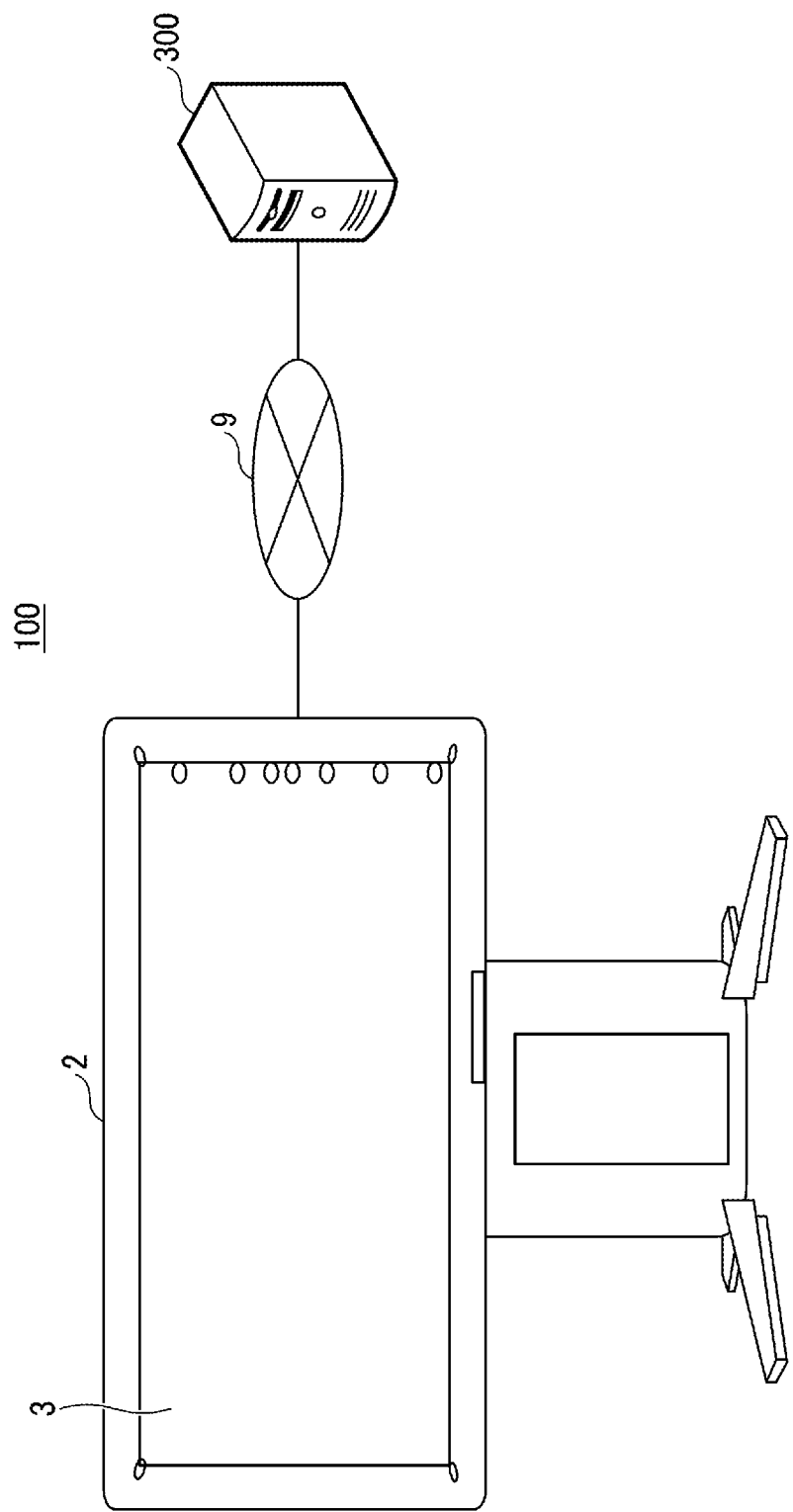
FIG. 20 is a diagram illustrating an example of a configuration of a display system.

FIG. 20 is a diagram illustrating an example of a configuration of a display system 100. The display system 100 illustrated in FIG. 20 includes the display apparatus 2 and an information processing apparatus 300 that are connected via the communication network 9 to communicate with each other. A plurality of display apparatuses 2 may communicate with the information processing apparatus 300 via the communication network 9. The information processing apparatus 300 is constructed of one or more computers and may support cloud computing. In addition, the information processing apparatus 300 may reside on-premises or on the Internet. In the configuration illustrated in FIG. 20, the information processing apparatus 300 can determine whether the event is a touch event or a pen event.

As illustrated in FIG. 20, when the display apparatus 2 and the information processing apparatus 300 communicate with each other via the communication network 9, the information processing apparatus 300 can manage hand drafted data. In this case, each of the plurality of display apparatuses 2 transmits stroke data to the information processing apparatus 300, and the information processing apparatus 300 transmits stroke data to another display apparatus 2. In this way, the display apparatuses 2 connected to the information processing apparatus 300 can share the hand drafted data.

The hardware configuration illustrated in FIG. 3 of the above-described embodiment is applicable to the present embodiment. A description is given below of a hardware configuration of the information processing apparatus 300.

Figure 21:
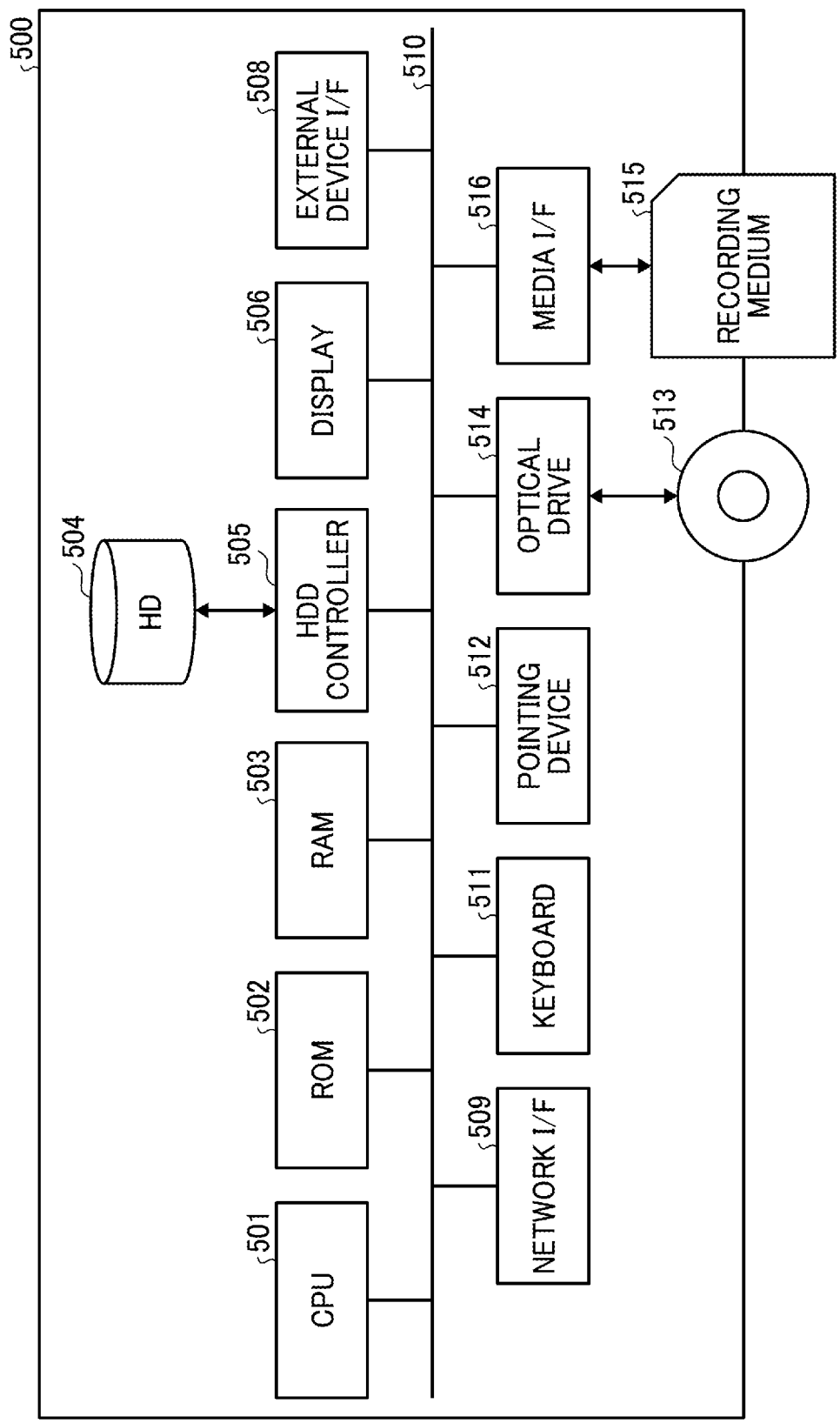
FIG. 21 is a block diagram illustrating an example of a hardware configuration of a computer.

FIG. 21 is a block diagram illustrating an example of the hardware configuration of a computer 500 that serves as the information processing apparatus 300. The computer 500 includes a CPU 501, a ROM 502, a RAM 503, a hard disk (HD) 504, a hard disk drive (HDD) controller 505, a display 506, an external device I/F 508, a network I/F 509, a bus line 510, a keyboard 511, a pointing device 512, an optical drive 514, and a media I/F 516.

The CPU 501 controls the entire operation of the computer 500. The ROM 502 stores programs, such as an initial program loader (IPL), for driving the CPU 501. The RAM 503 is used as a work area for the CPU 501. The HD 504 stores various kinds of data such as a program. The HDD controller 505 controls reading or writing of various kinds of data from or to the HD 504 under the control of the CPU 501. The display 506 displays various kinds of information such as a cursor, a menu, a window, characters, or an image. The external device I/F 508 is an interface for connecting various external devices. Examples of the external devices in this case include, but are not limited to, a USB memory and a printer.

The network I/F 509 is an interface for performing data communication via the network N. The bus line 510 is, for example, an address bus or a data bus for electrically connecting the components such as the CPU 501 illustrated in FIG. 3 with each other.

The keyboard 511 is a kind of input device including a plurality of keys used to input a character, a numerical value, various instructions, and the like. The pointing device 512 is a kind of an input device used to select or execute various instructions, select a target for processing, or move a cursor. The optical drive 514 controls the reading or writing of various kinds of data from or to an optical recording medium 513 that is an example of a removable recording medium. The optical recording medium 513 may be, for example, a compact disc (CD), a digital versatile disk (DVD), or a BLU-RAY. The media I/F 516 controls reading or writing (storing) of data from or to a recording medium 515 such as a flash memory.

Figure 22:
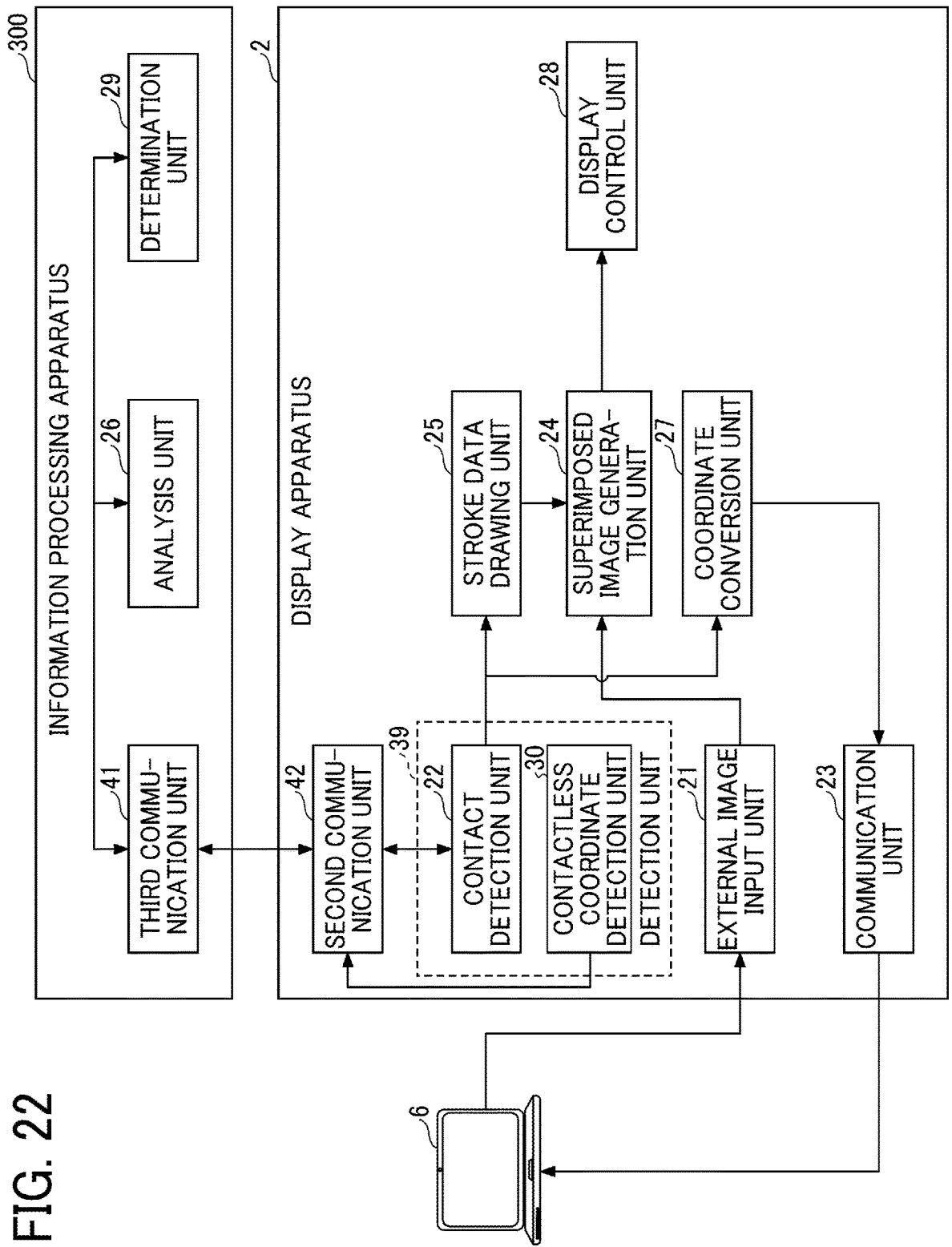
FIG. 22 is a block diagram illustrating an example of a functional configuration of a display apparatus and an information processing apparatus in the display system illustrated in FIG. 20.

FIG. 22 is a block diagram illustrating a functional configuration of the display apparatus 2 and the information processing apparatus 300 in the display system 100 illustrated in FIG. 20. In the description referring to FIG. 22, for simplicity, mainly differences from FIG. 6 are described. The display apparatus 2 illustrated in FIG. 22 includes a second communication unit 42. The second communication unit 42 transmits the contact coordinates, the presence or absence of the contact signal, and the pressing force obtained by the contact detection unit 22; and the contactless coordinates obtained by the contactless coordinate detection unit 30 to the information processing apparatus 300 in real time. Further, the second communication unit 42 receives the determination result indicating a touch event or a pen event from the information processing apparatus 300.

The information processing apparatus 300 includes a third communication unit 41, the analysis unit 26, and the determination unit 29. Each of the functional units of the information processing apparatus 300 is implemented by the CPU 501 illustrated in FIG. 21 executing an instruction included in one or more programs installed on the information processing apparatus 300.

The third communication unit 41 receives the contact coordinates, the presence or absence of a contact signal, the pressing force, and the contactless coordinates from the display apparatus 2, and transmits, to the display apparatus 2, a determination result indicating a touch event or a pen event. The analysis unit 26 and the determination unit 29 may function similarly to those illustrated in FIG. 6.

The second communication unit 42 inputs the determination result indicating a touch event or a pen event to the contact detection unit 22. When a touch event is received, the contact detection unit 22 causes the coordinate conversion unit 27 to convert the contact coordinates, and the communication unit 23 transmits the converted contact coordinates to the external device 6. When a pen event is received, the contact detection unit 22 inputs the contact coordinates to the stroke data drawing unit 25, and the stroke data drawing unit 25 generates stroke data based on the contact coordinates.

With the above-described configuration, the information processing apparatus 300 on the network can perform the processing related to the touch event or the pen event. Since the determination of whether the event is a touch event or a pen event is centralized in the information processing apparatus 300, maintenance is facilitated.

The allocation of the functional units is not limited to the description above. Alternatively, for example, the display apparatus 2 may include the analysis unit 26, and the information processing apparatus 300 may include the coordinate conversion unit 27.

FIG. 23 is an example of a sequence diagram illustrating an overall operation of the display system 100 including the information processing apparatus 300. For the convenience of explanation, FIG. 23 illustrates a case where the input means is determined based on the contact area.

S101: The second communication unit 42 of the display apparatus 2 transmits the contact coordinates and the coordinates of the partial region 40 to the information processing apparatus 300. The coordinates of the partial region 40 may be transmitted when there is a change.

S102: The third communication unit 41 of the information processing apparatus 300 receives the contact coordinates and the coordinates of the partial region 40, and the analysis unit 26 determines whether the touch is made to the partial region 40.

S103: When the touch is made outside the partial region 40, the input is to a region other than the partial region 40. Accordingly, the third communication unit 41 transmits, to the display apparatus 2, information indicating that a request for processing corresponding to the contact coordinates is received, such as input of stroke data or a menu operation regardless of whether the input is performed by the finger 11 or the stylus pen 4.

S104: In the case of the partial region 40, the determination unit 29 determines whether the contact area of the input means is equal to or greater than the threshold value. Determining that the contact area of the input means is equal to or greater than the threshold value means that the predetermined condition is satisfied. Determining that the contact area of the input means is smaller than the threshold value means that the predetermined condition is not satisfied.

S105: When the contact area is equal to or greater than the threshold value, the determination unit 29 determines that the input means is the finger 11 and generates a touch event. The third communication unit 41 transmits information indicating the touch event to the display apparatus 2. The second communication unit 42 of the display apparatus 2 receives the information indicating the touch event, and the communication unit 23 transmits the converted contact coordinates to the external device 6.

S106: When the contact area is smaller than the threshold value, the determination unit 29 determines that the input means is the stylus pen 4, and generates a pen event. The third communication unit 41 transmits information indicating the pen event to the display apparatus 2. The second communication unit 42 of the display apparatus 2 receives the information indicating the pen event, and the display control unit 28 displays the stroke data so as to be superimposed on the external image.

The process performed by the display apparatus 2 after receiving the information indicating the touch event or the pen event may be similar to that illustrated in FIG. 17 of Embodiment 1. In Step S104 illustrated in FIG. 23, whether the contact area is equal to or greater than the threshold value is determined. Alternatively, the presence or absence of the contact signal, the pressing force, or the number of input means may be determined as in Embodiment 1. Yet alternatively, as in Embodiment 2, the determination may be made based on whether the contactless coordinates are included in the partial region 40.

In the present embodiment, in addition to the effect provided in Embodiments 1 and 2, the information processing apparatus 300 can determine whether the event is a touch event or a pen event.

Although the example embodiments of the present invention are described above, the above-described embodiments are not intended to limit the scope of the present invention. Thus, numerous modifications and replacements of elements are possible within the scope of the present invention. For example, elements and/or features of different illustrative embodiments may be combined with each other and/or substituted for each other within the scope of the present invention.

Any one of the above-described operations may be performed in various other ways, for example, in an order different from the one described above.

In the description above, an electronic whiteboard is described as an example of the display apparatus 2. A device having substantially the same functions as the above-described electronic whiteboard 2 may be referred to as an electronic blackboard, an electronic information board, or an interactive board. The present disclosure is applicable to any information processing apparatus having a touch panel. Examples of an information processing apparatus equipped with a touch panel include a PC, a tablet terminal, and a smartphone each having a touch panel. These are general-purpose information processing apparatuses. However, when an application that functions as a display apparatus executes thereon, the user can operate the information processing apparatuses as display apparatuses.

Examples of the information processing apparatus with a touch panel further include, but are not limited to, a projector, an output device such as digital signage, a head up display, an industrial machine, an imaging device, a sound collecting device, a medical device, a network home appliance, a laptop computer, a mobile phone, a smartphone, a tablet terminal, a game console, a personal digital assistant (PDA), a digital camera, a wearable PC, and a desktop PC.

In addition, the display apparatus 2 according to the above-described embodiments may capture, with a camera, an image of an input means that performs input to the display 3, and may determine whether the event is a touch event or a pen event by image analysis.

Although not particularly mentioned in the above-described embodiments, stroke data may be recognized into a Japanese character string or converted into other languages (English, Chinese, Hindi, Spanish, French, Arabic, Russian, etc.), or formatting of the character string may be performed. The term "formatting" refers to processing to change the appearance of a character string with an attribute.

In the configuration illustrated in, for example, FIG. 6, functional units are divided into blocks in accordance with the main functions of the display apparatus 2, in order to facilitate understanding the operation by the display apparatus 2. No limitation is intended by how the functions are divided by process or by the name of the functions. The processing performed by the display apparatus 2 may be divided into a greater number of processing units depending on the content of the processing. In addition, a single processing unit can be further divided into a plurality of processing units.

The functionality of the elements of the described embodiments may be implemented by one or more processing circuits or circuitry which includes general purpose processors, special purpose processors, and integrated circuits and/or combinations thereof configured or programmed to perform the disclosed functionality. Here, the "processing circuit or circuitry" in the present specification includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Embodiments of the present disclosure can provide significant improvements in computer capability and functionality. These improvements allow users to take advantage of computers that provide more efficient and robust interaction with a display that receives input of information and presents the information in an information processing apparatus. In addition, the embodiments of the present disclosure can provide a better user experience through the use of a more efficient, powerful, and robust user interface. Such a user interface provides a better interaction between a human and a machine.

As described above, the present disclosure includes the following aspects.

Aspect 1

A display apparatus that displays an image input from an external device includes a detection unit to detect coordinates of an input means that has approached a position within a threshold distance from a touch panel, a communication unit to transmit the coordinates of the input means to the external device in a case where a predetermined condition is satisfied, and a display control unit to display stroke data based on the coordinates of the input means so as to be superimposed on the image in a case where the predetermined condition is not satisfied.

Aspect 2

The display apparatus according to Aspect 1 further includes a contact detection unit to detect coordinates of the input means that has touched the touch panel. In the case where the predetermined condition is satisfied, the communication unit transmits the coordinates of the input means that has touched the touch panel to the external device. In the case where the predetermined condition is not satisfied, the display control unit displays the stroke data based on the coordinates of the input means that has touched the touch panel so as to be superimposed on the image.

Aspect 3

In the display apparatus according to Aspect 2, the case where the predetermined condition is satisfied is a case where the input means is a finger, and the case where the predetermined condition is not satisfied is a case where the input means is a rod-shaped member thinner than the finger.

Aspect 4

In the display apparatus according to Aspect 3, the case where the predetermined condition is satisfied is a case where the input means is a relatively thin first rod-shaped member, and the case where the predetermined condition is not satisfied is a case where the input means is a second rod-shaped member thicker than the first rod-shaped member.

Aspect 5

The display apparatus according to Aspect 4 further includes a determination unit to determine that the input means is a finger in a case where a contact area of the input means with a region of the image on the touch panel is equal to or greater than a threshold value, and determine that the input means is the rod-shaped member in a case where the contact area of the input means with the region of the image on the touch panel is smaller than the threshold value.

Aspect 6

The display apparatus according to Aspect 3 further includes a determination unit to determine that the input means is a finger in a case where a contact signal is not received from the input means that has touched the region of the image on the touch panel, and determine that the input means is the rod-shaped member in a case where the contact signal is received from the input means that has touched the region of the image on the touch panel.

Aspect 7

The display apparatus according to Aspect 4 further includes a determination unit to determine that the input means is a finger in a case where a pressing force received from the input means that has touched the region of the image on the touch panel is not equal to or greater than a threshold value, and determine that the input means is the rod-shaped member in a case where the pressing force received from the input means that has touched the region of the image on the touch panel is equal to or greater than the threshold value.

Aspect 8

The display apparatus according to Aspect 3 further includes a determination unit to determine that the input means is a finger in a case where the contact detection unit detects coordinates of two input means that has touched the region of the image on the touch panel at timings that can be regarded as the same, and determine that the input means is the rod-shaped member in a case where the contact detection unit detects the coordinates of only one input means that has touched the region of the image on the touch panel.

Aspect 9

In the display apparatus according to any one of Aspects 2 to 8, the display control unit displays the image in advance in a partial region of an entire screen of the display apparatus. Further, the display apparatus performs the determination of the predetermined condition only in a case where the coordinates of the input means that has touched the touch panel match the partial region, and the display control unit displays the stroke data based on the coordinates in a case where the coordinates of the input means that has touched the touch panel do not match the partial region.

Aspect 10

The display apparatus according to Aspect 9, wherein the partial region is movable on the entire screen.

Aspect 11

In the display apparatus according to any one of Aspects 1 to 10, when the image from the external device is not being displayed, the display control unit displays the stroke data based on coordinates of the input means that has touched the touch panel irrespective of the predetermined condition.

Aspect 12

In the display apparatus according to Aspect 1, the case where the predetermined condition is satisfied is a case where the input means has approached the position within the threshold distance from the touch panel and the detection unit detects coordinates of the input means before the input means touches a region of the image, and the case where the predetermined condition is not satisfied is a case where the contact detection unit detects the coordinates of the input means that has touched the region of the image on the display.

Aspect 13

In the display apparatus according to Aspect 1, the case where the predetermined condition is satisfied is a case where the contact detection unit detects coordinates of the input means that has touched a region of the image on the display, and the case where the predetermined condition is not satisfied is a case where the input means has approached the position within the threshold distance from the touch panel and the detection unit detects coordinates of the input means before the input means touches the region of the image.

Aspect 14

The display apparatus according to Aspect 12 further includes a contactless coordinate detection unit to detect contactless coordinates of the input means before touching the touch panel in a case where the input means has approached the position within the threshold distance from the touch panel. In a case where the contactless coordinates of the input means match the region of the image, the communication unit transmits coordinates of the input means that has touched the touch panel to the external device. In a case where the contact detection unit detects the coordinates of the input means that has touched the touch panel and the coordinates match the region of the image, the display control unit displays the stroke data based on the coordinate so as to be superimposed on the image.

Aspect 15

In the display apparatus according to any one of Aspects 12 to 14, the input means is a finger or a rod-shaped member thinner than the finger.

Aspect 16

The display apparatus according to any one of Aspects 1 to 15 includes a coordinate conversion unit to convert the coordinates of the input means into coordinates on a display of the external device. In a case where the predetermined condition is satisfied, the communication unit transmits the coordinates converted by the coordinate conversion unit to the external device.

Aspect 17

In the display apparatus according to Aspect 1, in a case where the predetermined condition is satisfied, an input to a stroke image layer including the stroke data is not enabled, and the communication unit transmits, to the external device, coordinates of the input means that has touched a region of the image on the touch panel. The image from the external device is generated as an external image layer. In a case where the predetermined condition is not satisfied, the input to the stroke image layer is enabled, and the display apparatus outputs data in which the stroke image layer including the stroke data based on the coordinates of the input means that has touched the touch panel is superimposed on the external image layer, so as to display the stroke data superimposed on the image.

The invention claimed is:

1. A display apparatus comprising circuitry configured to:
    display, on a touch panel display, an image received from an external device that is external to the display apparatus;
    detect coordinates of a position of an input means that has approached the position within a threshold distance from the touch panel display;
    transmit the coordinates of the input means that has approached the position to the external device based on a first determination result indicating that a predetermined condition is satisfied; and
    display stroke data based on the coordinates of the input means that has approached the position so as to be superimposed on the image on the touch panel display based on a second determination result indicating that the predetermined condition is not satisfied,
    wherein the circuitry is further configured to:
    detect coordinates, on the touch panel display, of the input means that has touched the touch panel display;
    transmit the coordinates of the input means that has touched the touch panel display to the external device based on the first determination result; and
    display the stroke data based on the coordinates of the input means that has touched the touch panel display so as to be superimposed on the image on the touch panel display based on the second determination result,
wherein the predetermined condition is for determining whether the input means is a finger,
wherein the first determination result indicates that the input means is a finger, and
wherein the second determination result indicates that the input means is a rod-shaped member thinner than the finger.

2. The display apparatus according to claim 1,
wherein the predetermined condition is for determining whether the input means is a first rod-shaped member having a first thickness or a second rod-shaped member having a second thickness greater than the first thickness,
wherein the first determination result indicates that the input means is a first rod-shaped member having the first thickness, and
wherein the second determination result indicates that the input means is a second rod-shaped member having the second thickness greater than the first thickness.

3. The display apparatus according to claim 1, wherein the circuitry is configured to:
determine that the predetermined condition is satisfied such that the input means is a finger in a case where a contact area of the input means with a region of the image on the touch panel display is equal to or greater than a threshold value; and
determine that the predetermined condition is not satisfied such that the input means is the rod-shaped member in a case where the contact area is smaller than the threshold value.

4. The display apparatus according to claim 1, wherein the circuitry is configured to:
determine that the predetermined condition is satisfied such that the input means is a finger based on absence of a contact signal from the input means that has touched a region of the image on the touch panel display; and
determine that the predetermined condition is not satisfied such that the input means is the rod-shaped member based on receival of the contact signal from the input means that has touched the region of the image on the touch panel display.

5. The display apparatus according to claim 1, wherein the circuitry is configured to:
determine that the predetermined condition is satisfied such that the input means is a finger in a case where a pressing force received from the input means that has touched a region of the image on the touch panel display is smaller than a threshold value; and
determine that the predetermined condition is not satisfied such that the input means is the rod-shaped member in a case where the pressing force is equal to or greater than the threshold value.

6. The display apparatus according to claim 1, wherein the circuitry is further configured to:
determine that the predetermined condition is satisfied such that the input means is fingers based on detection of coordinates of two input means that have touched a region of the image on the touch panel display at substantially same timing; and
determine that the predetermined condition is not satisfied such that the input means is the rod-shaped member based on detection of coordinates of one input means that has touched the region of the image on the touch panel display.

7. The display apparatus according to claim 1, wherein the circuitry is configured to:
display the image in advance in a partial region of the touch panel display;
determine whether the predetermined condition is satisfied in a case where the coordinates of the input means that has touched the touch panel display match coordinates of the partial region; and
display the stroke data based on the coordinates of the input means on the touch panel display, based on a determination result indicating that the coordinates of the input means that has touched the touch panel display do not match the coordinates of the partial region.

8. The display apparatus according to claim 7,
wherein the partial region is movable on the touch panel display.

9. The display apparatus according to claim 1,
wherein, when the image from the external device is not being displayed, the circuitry is configured to display, on the touch panel display, the stroke data based on coordinates of the input means that has touched the touch panel display irrespective of the predetermined condition.

10. The display apparatus according to claim 1,
wherein the first determination result indicates that the predetermined condition is satisfied such that the input means has approached the position within the threshold distance from the touch panel display and that coordinates of the input means are detected before the input means touches a region of the image on the touch panel display, the coordinates being the coordinates of the position of the input means that has approached the position within the threshold distance, and
wherein the second determination result indicates that the predetermined condition is not satisfied such that coordinates of the input means that has touched the region of the image on the touch panel display are detected.

11. The display apparatus according to claim 10,
wherein the circuitry is configured to:
detect coordinates of the input means at the position within the threshold distance from the touch panel display, the coordinates being the coordinates of the position of the input means that has approached the position within the threshold distance;
transmit coordinates of the input means that has touched the touch panel display to the external device based on a determination result indicating that the coordinates of the input means match coordinates of the region of the image; and
display the stroke data based on the coordinates of the input means so as to be superimposed on the image on the touch panel display based on a determination result indicating that the coordinates of the input means that has touched the touch panel display are detected and that the coordinates match the region of the image.

12. The display apparatus according to claim 10,
wherein the input means is a finger or a rod-shaped member thinner than the finger.

13. The display apparatus according to claim 1,
wherein the first determination result indicates that the predetermined condition is satisfied such that coordinates of the input means that has touched a region of the image on the touch panel display are detected, and
wherein the second determination result indicates that the predetermined condition is not satisfied such that the input means has approached the position within the threshold distance from the touch panel display and that coordinates of the input means are detected before the input means touches the region of the image on the touch panel display, the coordinates being the coordinates of the position of the input means that has approached the position within the threshold distance.

14. The display apparatus according to claim 1, wherein the circuitry is further configured to:
convert the coordinates of the input means into coordinates on a display of the external device; and
transmit the converted coordinates to the external device based on the first determination result.

15. The display apparatus according to claim 1, wherein the circuitry is further configured to:
based on the first determination result, disable an input to a stroke image layer including the stroke data, and transmit, to the external device, coordinates of the input means that has touched a region of the image on the touch panel display, the image being generated as an external image layer; and
based on the second determination result, enable the input to the stroke image layer, and output data in which the stroke image layer including the stroke data is superimposed on the external image layer, so as to display the stroke data superimposed on the image on the touch panel display.

16. A method performed by a display apparatus, the method comprising:
displaying, on a touch panel display, an image received from an external device external to the display apparatus;
detecting coordinates of a position of an input means that has approached the position within a threshold distance from the touch panel display;
determining whether a predetermined condition is satisfied;
transmitting the coordinates of the input means that has approached the position to the external device based on a first determination result indicating that a predetermined condition is satisfied; and
displaying stroke data based on the coordinates of the input means that has approached the position so as to be superimposed on the image on the touch panel display based on a second determination result indicating that the predetermined condition is not satisfied,
wherein the method further comprises:
detecting coordinates, on the touch panel display, of the input means that has touched the touch panel display;
transmitting the coordinates of the input means that has touched the touch panel display to the external device based on the first determination result; and
displaying the stroke data based on the coordinates of the input means that has touched the touch panel display so as to be superimposed on the image on the touch panel display based on the second determination result,
wherein the predetermined condition is for determining whether the input means is a finger,
wherein the first determination result indicates that the input means is a finger, and
wherein the second determination result indicates that the input means is a rod-shaped member thinner than the finger.

17. A non-transitory recording medium storing a plurality of program codes which, when executed by one or more processors, causes the processors to perform the method according to claim 16.

18. A display system comprising:
a display apparatus including first circuitry configured to display an image received from an external device on a touch panel display; and
an information processing device communicable with the display apparatus via a network, the information processing device including second circuitry,
the first circuitry of the display apparatus being configured to:
detect coordinates of a position of an input means that has approached a position within a threshold distance from the touch panel display;
transmit the coordinates of the input means and coordinates of a region of the image on the touch panel display to the information processing apparatus;
receive a determination result of whether a predetermined condition is satisfied;
transmit the coordinates of the input means that has approached the position to the external device based on a first determination result indicating that the predetermined condition is satisfied; and
display stroke data based on the coordinates of the input means that has approached the position so as to be superimposed on the image on the touch panel display based on a second determination result indicating that the predetermined condition is not satisfied,
the second circuitry of the information processing apparatus being configured to transmit, to the display apparatus, the determination result indicating whether the predetermined condition is satisfied, the determination result being obtained based on the coordinates of the input means that has approached the position and the coordinates of the region of the image received from the display apparatus.

* * * * *